United States Patent
Teyeb et al.

(10) Patent No.: US 11,985,592 B2
(45) Date of Patent: May 14, 2024

(54) SYSTEMS AND METHODS FOR DETERMINING THE VALIDITY OF IDLE MODE MEASUREMENTS

(71) Applicant: Telefonaktiebolaget LM Ericsson (publ), Stockholm (SE)

(72) Inventors: Oumer Teyeb, Solna (SE); Patrik Rugeland, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 342 days.

(21) Appl. No.: 17/434,737

(22) PCT Filed: Feb. 17, 2020

(86) PCT No.: PCT/SE2020/050177
§ 371 (c)(1),
(2) Date: Aug. 28, 2021

(87) PCT Pub. No.: WO2020/176025
PCT Pub. Date: Sep. 3, 2020

(65) Prior Publication Data
US 2022/0174593 A1   Jun. 2, 2022

Related U.S. Application Data

(60) Provisional application No. 62/811,879, filed on Feb. 28, 2019.

(51) Int. Cl.
*H04W 24/00* (2009.01)
*H04W 16/18* (2009.01)
(Continued)

(52) U.S. Cl.
CPC ....... *H04W 52/0216* (2013.01); *H04W 24/08* (2013.01); *H04W 52/0258* (2013.01); *H04W 76/27* (2018.02)

(58) Field of Classification Search
CPC . H04W 52/0216; H04W 76/27; H04W 24/08; H04W 24/10; H04W 52/0258
See application file for complete search history.

(56) References Cited

U.S. PATENT DOCUMENTS

2012/0329402 A1* 12/2012 Ren .................. H04W 24/10
                                                    455/67.11
2019/0037425 A1*  1/2019 Hong ................ H04W 72/23

OTHER PUBLICATIONS

Author Unknown, "Technical Specification Group Radio Access Network; Evolved Universal Terrestrial Radio Access (E-UTRA); Requirements for support of radio resource management (Release 15)," Technical Specification 36.133, Version 15.9.0, Dec. 2019, 3GPP Organizational Partners, 3611 pages.
(Continued)

*Primary Examiner* — Moustapha Diaby
(74) *Attorney, Agent, or Firm* — Withrow & Terranova, PLLC

(57) ABSTRACT

Systems and methods are disclosed herein for determining the validity of idle mode measurements. In some embodiments, a method performed by a wireless device for determining a validity of one or more idle mode measurements performed for a cellular communications network comprises receiving, from a network node, an idle mode measurement configuration comprising a measurement duration time value and a validity time value for idle mode measurements. The method further comprises, while in a dormant state, performing one or more idle mode measurements according to the idle mode measurement configuration. The method further comprises determining that one or more idle mode measurement reports are invalid based on the validity time value and deleting the one or more idle mode measurement reports after determining that the one or more idle mode measurement reports are invalid based on the validity time value.

20 Claims, 17 Drawing Sheets

(51) Int. Cl.
    *H04W 24/06* (2009.01)
    *H04W 24/08* (2009.01)
    *H04W 52/02* (2009.01)
    *H04W 76/27* (2018.01)

(56) References Cited

OTHER PUBLICATIONS

Author Unknown, "Technical Specification Group Radio Access Network; Evolved Universal Terrestrial Radio Access (E-UTRA); and Evolved Universal Terrestrial Radio Access Network (E-UTRAN); Overall description; Stage 2 (Release 15)," Technical Specification 36.300, Version 15.3.0, Sep. 2018, 3GPP Organizational Partners, 358 pages.

Author Unknown, "Technical Specification Group Radio Access Network; Evolved Universal Terrestrial Radio Access (E-UTRA); and Evolved Universal Terrestrial Radio Access Network (E-UTRAN); Overall description; Stage 2 (Release 15)," Technical Specification 36.300, Version 15.4.0, Dec. 2018, 3GPP Organizational Partners, 363 pages.

Author Unknown, "Technical Specification Group Radio Access Network; Evolved Universal Terrestrial Radio Access (E-UTRA); and Evolved Universal Terrestrial Radio Access Network (E-UTRAN); Overall description; Stage 2 (Release 15)," Technical Specification 36.300, Version 15.8.0, Dec. 2019, 3GPP Organizational Partners, 365 pages.

Author Unknown, "Technical Specification Group Radio Access Network; Evolved Universal Terrestrial Radio Access (E-UTRA); Medium Access Control (MAC) protocol specification (Release 15)," Technical Specification 36.321, Version 15.8.0, Dec. 2019, 3GPP Organizational Partners, 134 pages.

Author Unknown, "Technical Specification Group Radio Access Network; Evolved Universal Terrestrial Radio Access (E-UTRA); Packet Data Convergence Protocol (PDCP) specification," Technical Specification 36.323, Version 15.0.0, Jul. 2018, 3GPP Organizational Partners, 51 pages.

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.4.0, Dec. 2018, 3GPP Organizational Partners, 933 pages.

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.8.0, Dec. 2019, 3GPP Organizational Partners, 964 pages.

Author Unknown, "Technical Specification Group Radio Access Network; Evolved Universal Terrestrial Radio Access Network (E-Utran); X2 application protocol (X2AP) (Release 15)," Technical Specification 36.423, Version 15.4.0, Dec. 2018, 3GPP Organizational Partners, 408 pages.

Author Unknown, "Technical Specification Group Radio Access Network; Evolved Universal Terrestrial Radio Access (E-UTRA) and NR; Multi-connectivity; Stage 2 (Release 15)" Technical Specification 37.340, Version 15.8.0, Dec. 2019, 3GPP Organizational Partners, 71 pages.

Author Unknown, "Technical Specification Group Radio Access Network; NR; Medium Access Control (MAC) protocol specification (Release 15), " Technical Specification 38.321, Version 15.8.0, Dec. 2019, 3GPP Organizational Partners, 78 pages.

Author Unknown, "Technical Specification Group Radio Access Network; NR; Packet Data Convergence Protocol (PDCP) specification (Release 15), " Technical Specification 38.323, Version 15.6.0, Jun. 2019, 3GPP Organizational Partners, 26 pages.

Author Unknown, "Technical Specification Group Radio Access Network; NR; Radio Resource Control (RRC) protocol specification (Release 15)," Technical Specification 38.331, Version 15.8.0, Dec. 2019, 3GPP Organizational Partners, 529 pages.

Author Unknown, "Technical Specification Group Radio Access Network; NG-RAN; Xn application protocol (XnAP) (Release 15), " Technical Specification 38.423, Version 15.4.0, Jul. 2019, 3GPP Organizational Partners, 309 pages.

International Search Report and Written Opinion for International Patent Application No. PCT/SE2020/050177, dated May 12, 2020, 12 pages.

Author Unknown, "Technical Specification Group Radio Access Network; Evolved Universal Terrestrial Radio Access (E-UTRA); Packet Data Convergence Protocol (PDCP) specification (Release 15)," Technical Specification 36.323, Version 15.5.0, Dec. 2019, 3GPP Organizational Partners, 52 pages.

Examination Report for European Patent Application No. 20708235.5, dated Apr. 13, 2023, 8 pages.

* cited by examiner

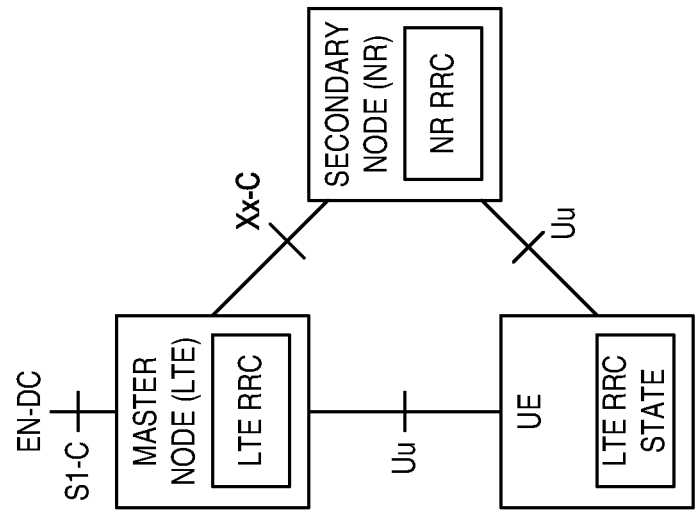
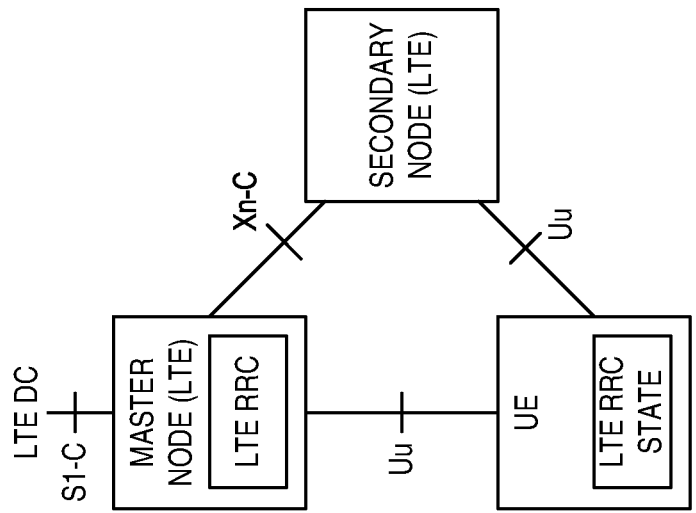
FIG. 1

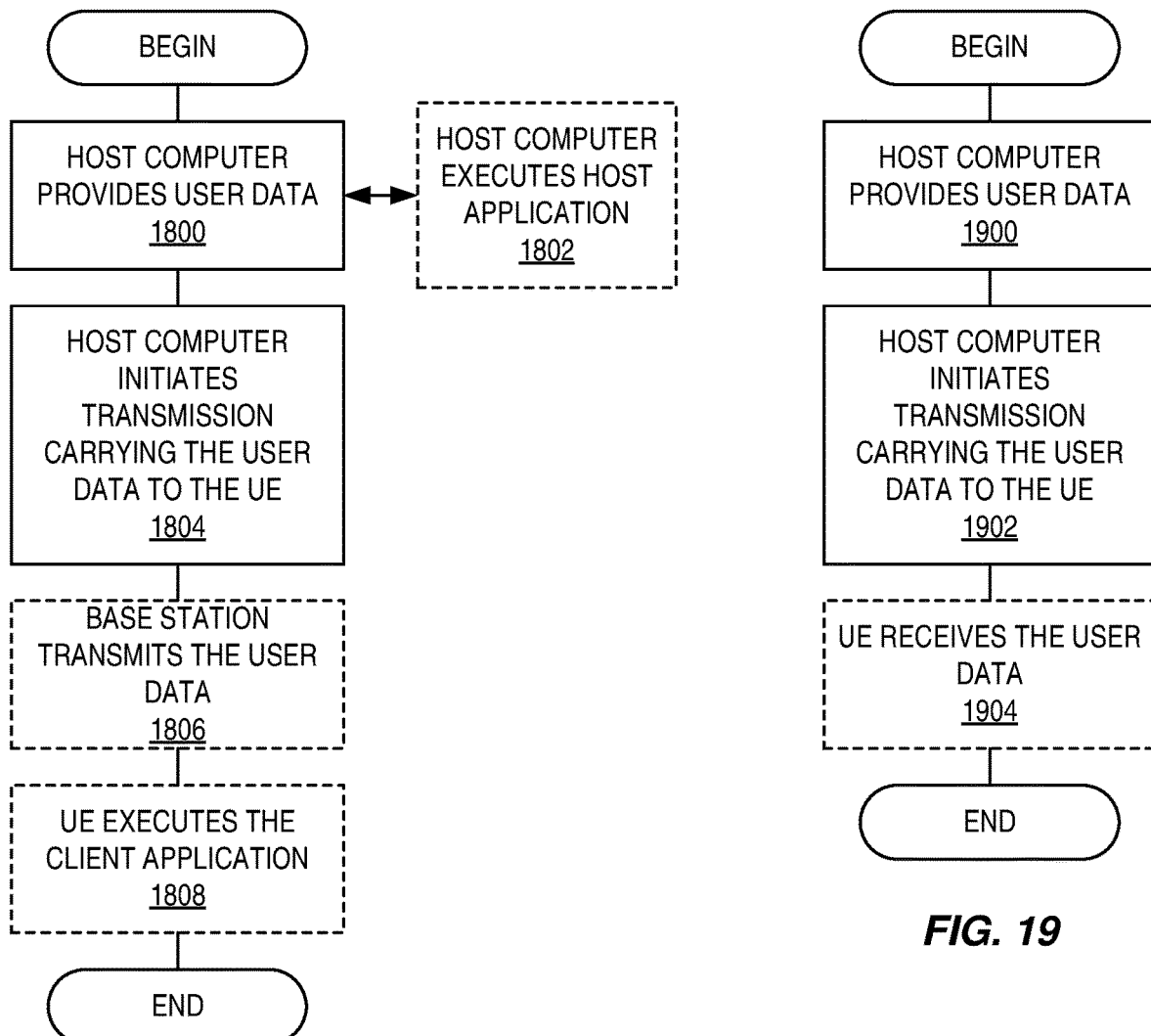

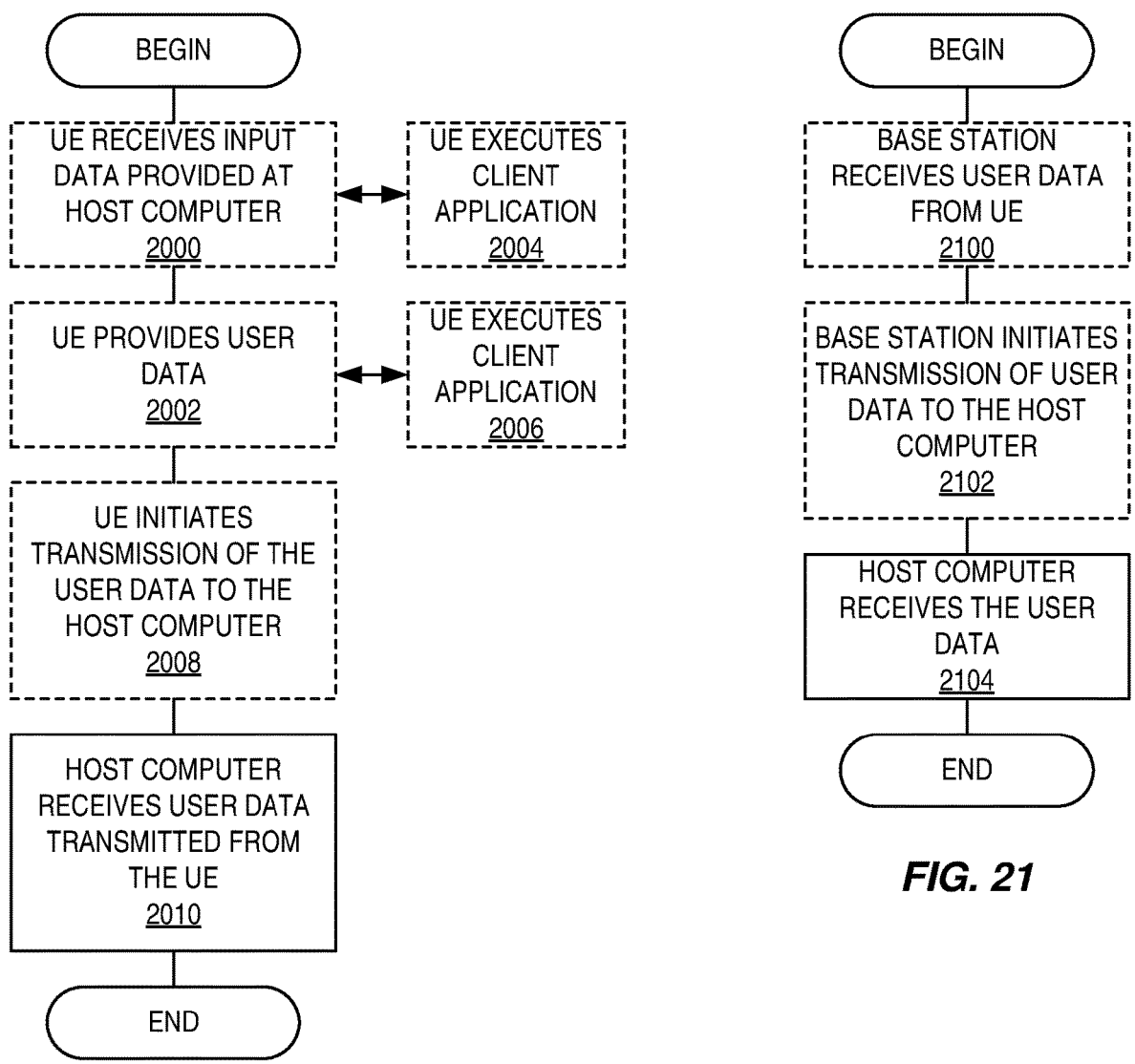

SYSTEMS AND METHODS FOR DETERMINING THE VALIDITY OF IDLE MODE MEASUREMENTS

RELATED APPLICATIONS

This application is a 35 U.S.C. § 371 national phase filing of International Application No. PCT/SE2020/050177, filed Feb. 17, 2020, which claims the benefit of provisional patent application Ser. No. 62/811,879, filed Feb. 28, 2019, the disclosures of which are hereby incorporated herein by reference in their entireties.

TECHNICAL FIELD

The present disclosure relates to measurements performed by a wireless device (e.g., a User Equipment (UE)) in a cellular communications system while the wireless device is in an idle mode and more specifically relates to determining the validity of such measurements.

BACKGROUND

In Third Generation Partnership Project (3GPP), the Dual Connectivity (DC) solution has been specified, both for Long Term Evolution (LTE) and between LTE and New Radio (NR). In DC, two nodes are involved, namely, a Master Node (MN), which is also referred to as a Master enhanced or evolved Node B (MeNB), and a Secondary Node (SN), which is also referred to as a Secondary enhanced or evolved Node B (SeNB). Multi-connectivity (MC) is the case when there are more than two nodes involved.

1 3GPP DC

As said above, DC is standardized for both LTE and Evolved Universal Terrestrial Radio Access (E-UTRA) NR DC (EN-DC). LTE DC and EN-DC are designed differently when it comes to which nodes control what. Basically, there are two options:
 a centralized solution (like LTE DC), and
 a decentralized solution (like EN-DC).

FIG. 1 shows a schematic control plane architecture for LTE DC (left-hand side) and EN-DC (right-hand side). The main difference here is that, in EN-DC, the SN has a separate Radio Resource Control (RRC) entity (NR RRC). This means that the SN in EN-DC can also control the UE. Sometimes, the SN in EN-DC can control the UE without the knowledge of the MN, but oftentimes the SN needs to coordinate with the MN. In LTE DC, RRC decisions always come from the MN (i.e., MN to UE). Note, however, that the SN still decides the configuration of the SN, since it is only the SN itself that has knowledge of what kind of resources, capabilities, etc. the SN has.

Below the two different DC specifications are discussed along with their RRC messages in more detail.

1.1 LTE DC

FIG. 2 illustrates an overview of LTE DC configurations. When the MeNB decides to request addition of an SeNB, which is sometimes referred to as "SeNB Addition", the MeNB indicates, within SCG-ConfigInfo (see, e.g., 3GPP Technical Specification (TS) 36.300 V15.4.0, Section 10.1.2.8.1), the Master Cell Group (MCG) configuration and the entire User Equipment (UE) capabilities for UE capability coordination as well as the latest measurement results for the Secondary Cell Group (SCG) cell(s) requested to be added, see FIG. 2. The SN responds by sending an acknowledgement with a SCG-Config and the latest measConfig to the MeNB. If the MeNB accepts the SCG-Config configurations, it sends this as well as the UE measurement configurations (MeasConfig) to the UE in the RRCConnectionReconfiguration message.

The MeNB cannot change the SCG-Config from the SeNB, just accept or reject. The reason for this is that the MeNB is not fully aware of the available resources and capabilities of the SeNB. Thus, if the MeNB modifies the SCG-Config, this modification can lead to the case that the UE utilizes incorrect resources. In practice, the measurement configuration is controlled by the MeNB. Note also that, in the LTE DC centralized solution, the UE's measurement report is only sent to the MeNB.

1.2 EN-DC

The second option is to use a decentralized option, which is used by EN-DC. This means that the SN can directly configure the UE with measurement.

In EN-DC, the main reason to have decentralized measurement configurations was latency requirements. Thus, by supporting a special Signaling Radio Bearer (SRB) (called SRB3) for the SN node (NR) which allows the SN to configure the measurement separately without involving the MN, the SN can speed up the measurements and measurement configurations. The thinking here is that SRB3 (using NR radio) may allow faster transmission than the corresponding LTE SRBs. Also, the backhaul link between the MN and the SN may be congested which could negatively affect both the measurement reporting and new measurement configurations.

Thus, sending the UE measurement report directly to the concerned node (MN or SN) can speed up the necessary action (e.g., switch node/add node). Another reason to have decentralized measurements is that LTE and NR use slightly different RRC and different mobility, which also makes it convenient to split the responsibility.

The decentralized EN-DC solution option includes measurement capability coordination. According to the latest 3GPP agreement, the SN shall inform the MN every time it changes which carrier frequencies the UE shall measure on. The measurement capability coordination is necessary to not exceed the number of carriers the UE can measure (and also for the gap coordination, see below in section 1.2.1 of the Background). If the MN and SN configure more carriers than the UE can measure on, the UE will probably randomly ignore one or more carriers for measurements. In the worst case, these ignored carriers may be the most important carriers to measure on.

If the SN receives a new value for the maximum number of frequency layers or reporting configurations from the MN and the SN has already configured all the allowed measurements or reporting configurations based on the previous maximum values, the SN releases the required number of measurements or reporting configurations to comply with the new limit.

It has now been explained why it is important to coordinate the measured frequency carriers. But it was also mentioned above that this is used to coordinate the measurement gaps. To understand why it is important to also coordinate the measurement gaps between the MN and the SN, there is a need to understand how the measurements in EN-DC work in more detail (see section 1.2.1 of the Background below).

1.2.1 Measurement Gaps in EN-DC

EN-DC may use both "LTE frequencies" and very high Fifth Generation (5G) frequencies. 3GPP distinguishes between Frequency Range 1 (FR1) and FR2 frequencies. FR1 is below 6 Gigahertz (GHz), and FR2 is above 28 GHz. The reason this is done like this is because of different UE capabilities. Some more advanced UEs can receive data on FR1 and measure on FR2 simultaneously (and vice versa of course) while some cannot measure on FR1 and receive data on FR2 at the same time (and vice versa).

To be able to measure on any frequency (FR1 or FR2), the UE must be configured with a so-called "gap", i.e. a certain time when the UE does not receive any data on this frequency and can focus on measuring on other cells in this frequency range. If UE can receive data on FR1 and measure on FR2 simultaneously (and vice versa), the "gap" is called per-FR gap. If a UE cannot measure on FR1 and receive data on FR2 simultaneously (and vice versa), it is called per-UE gap. The most efficient way is always to configure per-FR gap, because per-UE gap will influence the scheduling of all serving cells and consequently both FR1 and FR2 data will then be interrupted, i.e. all data transmission will be impacted for a short period for per-UE gap measurements.

Radio Access Network 2 (RAN2) has agreed that the network can choose either per-UE gap or per-FR gap for a UE. As said earlier, both the MN and SN can configure the UE with measurement gaps. Thus, some gap coordination is needed. This gap coordination is a bit tricky, and perhaps not absolutely necessary to understand for the present disclosure, but for completeness mentioned here.

In general, the MN configures the gap to the UE if the UE is per-UE capable. Thus, the MN needs to know the SN frequencies in order to also calculate a suitable gap for the SN, and then send this gap configuration to the SN. The SN can send the FR1/FR2 frequencies to the MN via CG-Config.

If the UE is capable of per FR1/FR2 gaps, it is decided that the MN configures the FR1 gaps and the SN configures the FR2 gaps. However, for the per FR1/FR2 gap case, the MN and SN need to coordinate the gaps so they don't overlap.

For either per-UE gap or per-LTE/FR1 gap, the MN transmits the gap pattern to the SN via CG-ConfigInfo (CG-ConfigInfo is the NR name of the SCG-Config in LTE).

1.3 EN-DC Overview

An overview of the above EN-DC measurement configurations is given in FIG. 3. Note that an important difference compared to LTE DC is that since the SN can also configure the UE's measurements, measurement reports are also transmitted to the SN via the SRB3 (if configured). The SN then directly acts upon these measurements; the MN never receives these measurements (at least there is no specification that supports this by default). If SRB3 is not configured, the measurement configurations from the SN (and the measurement reports from the UE based on these measurement configurations) are sent to the UE (and the measurement results to the SN) via embedded RRC messages from/to the MN on SRB1, which the MN transparently forwards to the UE (the configurations) and the SN (measurement results).

2 MC

The idea with MC is that the UE can connect to more than two nodes, i.e. more than one SN node. The benefits with MC are similar to DC, but MC allows even more new areas to be utilized, e.g. centralized scheduler, even more robust mobility, etc.

For a MC solution with only one type of radio, e.g. NR base stations, some of the above arguments to have a decentralized solution are not as strong anymore since all NR nodes should be equally capable.

From a migration point of view, it is natural to continue using EN-DC principles for MC, i.e. using a decentralized solution. Also, there may still be cases when a decentralized measurement solution is beneficial, e.g. when the nodes have different capabilities (e.g., 700 megahertz (MHz) vs. 28 GHz nodes).

3 Early Measurements Solution Upon Idle to Connected Transition in LTE (Release 15)

In LTE, it is possible to configure the UE to report early measurements upon the transition from idle to connected state. These measurements are measurements that the UE has performed in idle state and according to a configuration provided by the source cell with the intention to receive these measurements and quickly setup DC/Carrier Aggregation (CA) without the need to first provide a measurement configuration (measConfig) to the UE in connected state and wait for hundreds of milliseconds until the UE is able to perform measurements and a measurement report is triggered.

A first aspect of the existing solution, as standardized in E-UTRA TS 36.331 V15.4.0, is described in 5.6.20 Idle Mode Measurements. Therein, the UE is configured upon the transition from RRC_CONNECTED to RRC_IDLE with a dedicated measurement configuration in the RRCConnectionRelease message, highlighted as follows:

| RRCConnectionRelease message |
|---|
| ‑‑ ASN1START<br>RRCConnectionRelease ::=                SEQUENCE {<br>  rrc-TransactionIdentifier           RRC-TransactionIdentifier,<br>  criticalExtensions                  CHOICE {<br>    c1                                CHOICE {<br>      rrcConnectionRelease-r8         RRCConnectionRelease-r8-IEs,<br>      spare3 NULL, spare2 NULL, spare1 NULL<br>    },<br>    criticalExtensionsFuture            SEQUENCE { }<br>  }<br>}<br>‑‑ other info has been omitted<br>RRCConnectionRelease-v1530-IEs ::=       SEQUENCE {<br>  drb-ContinueROHC-r15                ENUMERATED {true}              OPTIONAL, ‑‑<br>Cond UP-EDT<br>  nextHopChainingCount-r15            NextHopChainingCount           OPTIONAL, ‑‑<br>Cond UP-EDT<br>  measIdleConfig-r15                  MeasIdleConfigDedicated-r15<br>  OPTIONAL, ‑‑ Need ON<br>  rrc-InactiveConfig-r15              RRC-InactiveConfig-r15         OPTIONAL, ‑‑<br>Need OR<br>    cn-Type-r15                       ENUMERATED {epc,fivegc}        OPTIONAL,<br>    ‑‑ Need OR |

-continued

| | | |
|---|---|---|
| nonCriticalExtension | SEQUENCE { } | OPTIONAL |
| }  | | |
| -- ASN1STOP | | |

MeasIdleConfig information element

```
-- ASN1START
MeasIdleConfigDedicated-r15 ::= SEQUENCE {
    measIdleCarrierListEUTRA-r15      EUTRA-CarrierList-r15         OPTIONAL,
    -- Need OR
    measIdleDuration-r15              ENUMERATED {sec10, sec30, sec60, sec120,
                                           sec180, sec240, sec300, spare},
    ...
}
EUTRA-CarrierList-r15 ::= SEQUENCE (SIZE (1..maxFreqIdle-r15)) OF
MeasIdleCarrierEUTRA-r15
MeasIdleCarrierEUTRA-r15::=       SEQUENCE {
    carrierFreq-r15                   ARFCN-ValueEUTRA-r9,
    allowedMeasBandwidth-r15          AllowedMeasBandwidth,
    validityArea-r15                  CellList-r15                  OPTIONAL, --
Need OR
    measCellUst-r15                   CellList-r15                  OPTIONAL, --
Need OR
    reportQuantities                  ENUMERATED {rsrp, rsrq, both},
    qualityThreshold-r15              SEQUENCE {
        idleRSRP-Threshold-r15            RSRP-Range                OPTIONAL,
    -- Need OR
        idleRSRQ-Threshold-r15            RSRQ-Range-r13            OPTIONAL--
Need OR
    }                                                               OPTIONAL, --
Need OR
    ...
}
CellList-r15 ::=                  SEQUENCE (SIZE (1.. maxCellMeasIdle-r15)) OF
PhysCellIdRange
-- ASN1STOP
```

MeasIdleConfig field descriptions allowedMeasBandwidth
If absent, the value corresponding to the downlink bandwidth indicated by the dl-
Bandwith included in MasterInformationBlock of serving cell applies.
carrierFreq
Indicates the E-UTRA carrier frequency to be used for measurements during IDLE
mode.
measIdleCarrierListEUTRA
Indicates the E-UTRA carriers to be measured during IDLE mode.
measIdleDuration
Indicates the duration for performing measurements during IDLE mode for
measurements assigned via RRCConnectionRelease. Value sec10 correspond to 10
seconds, value sec30 to 30 seconds and so on.
qualityThreshold
Indicates the quality thresholds for reporting the measured cells for IDLE mode
measurements.
reportQuantities
Indicates which measurement quantities UE is requested to report in the IDLE
mode measurement report.
measCellList
Indicates the list of cells which the UE is requested to measure and report for IDLE
mode measurements.
validityArea
Indicates the list of cells within which UE is requested to do IDLE mode
measurements. If the UE reselects to a cell outside this list, the measurements are
no longer required.

As it can be seen above, a duration timer (configured by measIdleDuration) is also introduced in that configuration. The duration timer is started upon the reception of the dedicated measurement configuration and stops upon receiving RRCConnectionSetup, RRCConnectionResume, or, if validityArea is configured, upon reselecting to a cell that does not belong to validityArea. Upon expiry, these measurements performed in idle may be discarded. Another concept is the validity area. The intention is to limit the area where CA/DC may be setup later when the UE resumes/setups the connection, so the early measurements are somewhat useful for that purpose. Notice also that only measurements above a certain threshold shall be stored as the cell candidates for DC/CA setup.

How the UE performs measurements in IDLE mode is up to UE implementation as long as RAN4 requirements for measurement reporting defined in TS 36.133 are met.

The UE behavior is shown below in more detail, as captured in TS 36.331 V15.4.0:

5.6.20 Idle Mode Measurements
5.6.20.1 General
This procedure specifies the measurements done by a UE in RRC_IDLE when it has an
IDLE mode measurement configuration and the storage of the available
measurements by a UE in both RRC_IDLE and RRC_CONNECTED.
5.6.20.2 Initiation
While T331 is running, the UE shall:
   1> perform the measurements in accordance with the following:
      2> for each entry in measIdleCarrierListEUTRA within VarMeasIdleConfig:
         3> if UE supports carrier aggregation between serving carrier and the
            carrier frequency and bandwidth indicated by carrierFreq and
            allowedMeasBandwidth within the corresponding entry;
            4>perform measurements in the carrier frequency and bandwidth indicated
               by carrierFreq and allowedMeasBandweth within the corresponding
               entry;
            NOTE: How the UE performs measurements in IDLE mode is up to UE
               implementation as long as the requirements in 36.133 [16] are met for
               measurement reporting. UE is not required to perform idle
               measurements if SIB2 idle measurement indication is not configured.
            4>if the measCellList is included:
               5> consider PCell and cells identified by each entry within the
                  measCellList to be applicable for idle mode measurement reporting;
            4>else:
               5> consider PCell and up to maxCellMeasIdle strongest identified
                  cells whose RSRP/RSRQ measurement results are above the value(s)
                  provided in qualityThreshold (if any) to be applicable for idle mode
                  measurement reporting;
            4>store measurement results for cells applicable for idle mode
               measurement reporting within the VarMeasIdleReport,
        3> else:
            4>do not consider the carrier frequency to be applicable for idle mode
               measurement reporting;
   1> if validilyArea is configured in VarMeasIdleConfig and UE reselects to a serving
      cell whose physical cell identity does not match any entry in validilyArea for the
      corresponding carrier frequency:
      2> stop T331;
5.6.20.3 T331 expiry or stop
The UE shall:
   1> if T331 expires or is stopped:
      2> release the contents of VarMeasIdleConfig;
   NOTE: It is up to UE implementation whether to continue IDLE mode
         measurements according to SIBS configuration after T331 has expired or
         stopped.

Instead of dedicated configuration during RRC Release, it is also possible for the network to broadcast idle mode measurement configurations in the system information (which is included in SIB5). An example is shown below.

```
MeasIdleConfigSIB-r15 ::= SEQUENCE {
    measIdleCarrierListEUTRA-r15        EUTRA-CarrierList-r15,
    ...
}
```

The difference from the dedicated idle mode measurement configuration is that there is no timer (measIdleDuration) that specifies for how long the UE should keep measuring while in IDLE mode. Thus, it will be up to UE implementation when to stop measuring.

Another aspect of the existing solution occurs when the UE tries to resume or setup a call from RRC_IDLE without context. If the previous step is performed, i.e. if the UE is configured to store idle measurements, the network may send a request to the UE after resume/setup (after security is activated) to determine whether the UE has idle measurements available.

In the case this UE is setting up a connection coming from RRC_IDLE without the Access Stratum (AS) Context, the network is not aware that the UE has available measurements stored. Then, to allow the network to know, and possibly request, the UE to report early measurements, the UE may indicate the availability of stored idle measurements in RRCConnectionSetupComplete. As not all cells would support the feature anyway, the UE only includes that availability information if the cell broadcasts the idleModeMeasurements indication in SIB2. The flag in RRCReconnectionSetupComplete and procedure text are shown below:

```
RRCConnectionSetupComplete-v1530-IEs ::= SEQUENCE {
    logMeasAvailableBT-r15         ENUMERATED {true}
    OPTIONAL,
    logMeasAvailableWLAN-r15       ENUMERATED {true}
    OPTIONAL,
    idleMeasAvailable-r15          ENUMERATED {true}
    OPTIONAL,
    flightPathInfoAvailable-r15    ENUMERATED {true}
    OPTIONAL,
    connectTo5GC-r15               ENUMERATED {true}
    OPTIONAL,
    registeredAMF-r15              RegisteredAMF-r15
    OPTIONAL,
    s-NSSAI-list-r15               SEQUENCE(SIZE
(1..maxNrofS-NSSAI-r15)) OF S-NSSAI-r15 OPTIONAL,
    ng-5G-S-TMSI-Bits-r15          CHOICE {
        ng-5G-S-TMSI-r15               NG-5G-S-TMSI-r15,
        ng-5G-S-TMSI-Part2-r15         BIT STRING (SIZE (8))
    }                                  OPTIONAL,
    nonCriticalExtension           RRCConnectionSetupComplete-v1540-
                                   IEs
    OPTIONAL
}
``` and 5.3.3.4 Reception of the RRCConnectionSetup by the UE
NOTE 1: Prior to this, lower layer signalling is used to allocate a C-RNTI.
For further details see TS 36.321 [6];
The UE shall:
1> if the RRCConnectionSetup is received in response to an RRCConnectionResumeRequest from a suspended RRC connection:
. . .
1> set the content of RRCConnectionSetupComplete message as follows:
    2> if the RRCConnectionSetup is received in response to an RRCConnectionResumeRequest:
. . .
    2> if the UE is connected to EPC:
      3> except for NB-IoT:
        4> if the SIB2 contains idleModeMeasurements, and the UE has IDLE mode measurement information available in VarMeasIdleReport:
          5> include the idleMeasAvailable;
      4>stop T331 (if running);
. . .
      3> for NB-IoT:
        4> if the UE supports serving cell idle mode measurements reporting and servingCellMeasInfo is present in SystemInformationBlockType2-NB:
          5> set the measResultServCell to include the measurements of the serving cell;
          NOTE 2: The UE includes the latest results of the serving cell measurements as used for cell selection/ reselection evaluation, which are performed in accordance with the performance requirements as specified in TS 36.133 [16].
      3> include dcn-ID if a DCN-ID value (see TS 23.401 [41]) is received from upper layers;

In the case this UE is setting up a connection coming from RRC_IDLE but with a stored AS Context (i.e., resume from suspended), the network may be aware that the UE may have available idle measurements stored after checking the fetched context from the source node where the UE got suspended. However, it is still not certain that the UE has measurements available since the UE is only required to perform the measurements if the cells are above the configured Reference Signal Received Power (RSRP)/Reference Signal Received Quality (RSRQ) thresholds and while it performs cell selection/cell reselection within the configured validity area. Then, to allow the network to know, and possibly request, the UE to report early measurements, the UE may also indicate the availability of stored idle measurements in RRCConnectionResumeComplete. As not all cells would support the feature anyway, the UE only includes that availability information if the cell broadcasts the idleModeMeasurements indication in SIB2. The flag in RRCReconnectionResumeComplete and procedure text are shown below:

```
RRCConnectionResumeComplete-v1530-IEs ::= SEQUENCE {
    logMeasAvailableBT-r15         ENUMERATED {true} OPTIONAL,
    logMeasAvailableWLAN-r15       ENUMERATED {true} OPTIONAL,
    idleMeasAvailable-r15          ENUMERATED {true} OPTIONAL,
    flightPathInfoAvailable-r15    ENUMERATED {true} OPTIONAL,
    nonCriticalExtension           SEQUENCE { }     OPTIONAL
}
``` and 5.3.3.4a Reception of the RRCConnectionResume by the UE
The UE shall:
. . .
1> set the content of RRCConnectionResumeComplete message as follows:
    2> except for NB-IoT:
. . .
      3> if the SIB2 contains idleModeMeasurements, and the UE has IDLE mode measurement information available in VarMeasIdleReport:
        4> include the idleMeasAvailable;
      3> stop T331 (if running);
    2> for NB-IoT:
      3> if the UE supports serving cell idle mode measurements reporting and servingCellMeasInfo is present in SystemInformationBlockType2-NB:
        4> set the measResultServCell to include the measurements of the serving cell;
        NOTE: The UE includes the latest results of the serving cell measurements as used for cell selection/ reselection evaluation, which are performed in accordance with the performance requirements as specified in TS 36.133 [16].
1> submit the RRCConnectionResumeComplete message to lower layers for transmission;
1> the procedure ends.

Another aspect of the existing solution occurs when the UE tries to resume. If the previous step is performed, i.e. if the UE is configured to store idle measurements, the network may send a request to the UE after resume/setup (after security is activated) to determine whether the UE has idle measurements available.

In the case this UE is resuming, the target cell/node will be able to find out if it is within the validity area for the idle measurements the UE has been configured with before being suspended since it can check the saved UE context retrieved from context fetching. Thus, it can request the availability of these stored measurements by sending a UEInformationRequest message to the UE, after the UE starts security, as illustrated in FIG. 4.

5.6.5.3 Reception of the UEInformationRequest message
Upon receiving the UEInformationRequest message, the UE shall, only after successful security activation:
...
1> if the idleModeMeasurementReq is included in the UEInformationRequest and UE has stored VarMeasIdleReport:
    2> set the measResultListIdle in the UEInformationResponse message to the value of idleMeasReport in the VarMeasIdleReport;
    2> discard the VarMeasIdleReport upon successful delivery of the UEInformationResponse message confirmed by lower layers;
...

UEInformationResponse message

```
-- ASN1START
UEInformationResponse-r9 ::=    SEQUENCE {
    rrc-TransactionIdentifier   RRC-TransactionIdentifier,
```

```
    criticalExtensions            CHOICE {
        c1                        CHOICE {
            ueInformationResponse-r9      UEInformationResponse-r9-IEs,
            spare3 NULL, spare2 NULL, spare1 NULL
        },
        criticalExtensionsFuture  SEQUENCE { }
    }
}
UEInformationResponse-v1530-IEs ::= SEQUENCE {
    measResultListIdle-r15        MeasResultListIdle-r15
    OPTIONAL,
    flightPathInfoReport-r15      FlightPathInfoReport-r15  OPTIONAL,
    nonCriticalExtension          SEQUENCE { }              OPTIONAL
}
```

In summary, measurements performed in idle may only be provided after security is setup. If the UE is released to IDLE (i.e., no UE context stored), security can be up and running only after security mode command procedure (two radio Round Trip Times (RTTs) after the UE enters RRC_CONNECTED, i.e. reception of RRCConnectionSetup), which may take quite some time until the UE reports these measurements and the network can make educated decisions based on these, such as the setup of CA and/or DC.

If the UE is suspended to IDLE (i.e., UE context stored), there is no need for the security mode command procedure and security can be up and running upon the reception of RRCConnectionResume, which contains the next hop chaining counter that enables the UE to start security according to target configuration. Then, after the UE enters RRC_CONNECTED, the network may send the UEInformationRequest and get the UEInformationResponse with the idle measurements.

In case resumption of a data connection due to downlink data, the network is typically already aware of whether the data connection would require a CA or DC connection before the actual establishment/resumption. The network then typically knows, e.g., whether there is a lot of data to transfer and/or the requirements for the service, such as the latency requirements.

SUMMARY

Systems and methods are disclosed herein for determining the validity of idle mode measurements. In some embodiments, a method performed by a wireless device for determining a validity of one or more idle mode measurements performed for a cellular communications network comprises receiving, from a network node, an idle mode measurement configuration comprising a measurement duration time value and a validity time value for idle mode measurements. The method further comprises, while in a dormant state, performing one or more idle mode measurements according to the idle mode measurement configuration. The method further comprises determining that one or more idle mode measurement reports are invalid based on the validity time value and deleting the one or more idle mode measurement reports after determining that the one or more idle mode measurement reports are invalid based on the validity time value.

In some embodiments, the method further comprises starting a first timer upon transitioning from a connected state to the dormant state, the first timer being initialized to the measurement duration time value and starting a second timer upon expiry of the first timer, the second timer being initialized to the validity time value. Further, determining that the one or more idle mode measurement reports are invalid based on the validity time value comprises determining that the second timer has expired.

In some embodiments, the method further comprises starting a first timer upon transitioning from a connected state to the dormant state, the first timer being initialized to the measurement duration time value and starting a second timer upon expiry of the first timer, the second timer being initialized to the validity time value. Further, determining that the one or more idle mode measurement reports are invalid based on the validity time value comprises determining that the second timer has expired prior to a time at which the one or more idle mode measurement reports could be reported by the wireless device.

In some embodiments, the method further comprises starting a first timer upon transitioning from a connected state to the dormant state, the first timer being initialized to the measurement duration time value and starting a second timer upon expiry of the first timer, the second timer being initialized to the validity time value. Further, determining that the one or more idle mode measurement reports are invalid based on the validity time value comprises determining that the second timer has expired prior to receiving a message from a network node that initiates a transition of the wireless device from the dormant state to the connected state.

In some embodiments, the method further comprises starting a validity timer upon transitioning from a connected state to the dormant state, the validity timer being initialized to the validity time value. Further, determining that the one or more idle mode measurement reports are invalid based on the validity time value comprises determining that the validity timer has expired.

In some embodiments, the method further comprises starting a validity timer upon transitioning from a connected state to the dormant state, the validity timer being initialized to the validity time value. Further, determining that the one or more idle mode measurement reports are invalid based on the validity time value comprises determining that the validity timer has expired prior to a time at which the one or more idle mode measurement reports could be reported by the wireless device.

In some embodiments, the method further comprises starting a validity timer upon transitioning from a connected state to the dormant state, the validity timer being initialized to the validity time value. Further, determining that the one or more idle mode measurement reports are invalid based on the validity time value comprises determining that the validity timer has expired prior to receiving a message from a network node that initiates a transition of the wireless device from the dormant state to the connected state.

In some embodiments, the method further comprises starting a measurement duration timer upon transitioning from the connected state to the dormant state, the measurement duration timer being initialized to the measurement duration time value. Further, performing the one or more idle mode measurements according to the idle mode measurement configuration comprises performing the one or more idle mode measurements according to the idle mode measurement configuration until the measurement duration timer has expired or is otherwise stopped.

In some embodiments, the method further comprises receiving a message from a network node that initiates a transition of the wireless device from the dormant state to a connected state, and determining that the one or more idle mode measurement reports are invalid based on the validity time value comprises determining whether an elapsed amount of time is greater than the validity time value. In some embodiments, the elapsed amount of time is an amount of time since the wireless device transitioned to the dormant state. In other some embodiments, the method further comprises starting a measurement duration timer upon transitioning from the connected state to the dormant state where the measurement duration timer is initialized to the measurement duration time value, performing the one or more idle mode measurements comprises performing the one or more idle mode measurements until the measurement duration timer has expired, and the elapsed amount of time is an amount of time since the measurement duration timer expired.

In some embodiments, the method further comprises refraining from sending an indication to a network node that idle mode measurements are available at the wireless device.

In some embodiments, the measurement duration time value and the validity time value correspond to a single configured value such that the single configured value is both the measurement duration time value and the validity time value.

In some embodiments, the measurement duration time value and the validity time value are different configured values.

Embodiments of a wireless device are also disclosed. In some embodiments, a wireless device for determining a validity of one or more idle mode measurements performed for a cellular communications network is adapted to receive, from a network node, an idle mode measurement configuration comprising a measurement duration time value and a validity time value for idle mode measurements. The wireless device is further adapted to, while in a dormant state, perform one or more idle mode measurements according to the idle mode measurement configuration. The wireless device is further adapted to determine that one or more idle mode measurement reports are invalid based on the validity time value, and delete the one or more idle mode measurement reports after determining that the one or more idle mode measurement reports are invalid based on the validity time value.

In some embodiments, the wireless device comprises one or more transmitters, one or more receivers, and processing circuitry associated with the one or more transmitters and the one or more receivers. The processing circuitry is configured to cause the wireless device to receive the idle mode measurement configuration from the network node. The processing circuitry is further configured to cause the wireless device to, while in the dormant state, perform the one or more idle mode measurements according to the idle mode measurement configuration. The processing circuitry is further configured to cause the wireless device to determine that the one or more idle mode measurement reports are invalid based on the validity time value and delete the one or more idle mode measurement reports after determining that the one or more idle mode measurement reports are invalid based on the validity time value.

In some embodiments, a method performed by a wireless device to enable determination of a validity of one or more idle mode measurements performed for a cellular communications network comprises, while in a dormant state, performing one or more idle mode measurements and storing the one or more idle mode measurements with associated measurement timestamps. The method further comprises receiving a message from a network node that initiates a transition of the wireless device from the dormant state to a connected state and sending the one or more idle mode measurements and the associated measurement timestamps to the network node.

In some embodiments, the method further comprises, upon receiving the message from the network node that initiates the transition of the wireless device from the dormant state to the connected state, sending a message to the network node that comprises an indication that the wireless device has available idle mode measurements.

In some embodiments, for each idle mode measurement of the one or more idle mode measurements, the associated measurement timestamp is a value that indicates an amount of time between a time at which the wireless device transitioned to the dormant state and a time at which the idle mode measurement was performed by the wireless device.

In some embodiments, a wireless device for enabling determination of a validity of one or more idle mode measurements performed for a cellular communications network is adapted to, while in a dormant state, perform one or more idle mode measurements and store the one or more idle mode measurements with associated measurement timestamps. The wireless device is further adapted to receive a message from a network node that initiates a transition of the wireless device from the dormant state to a connected state and send the one or more idle mode measurements and the associated measurement timestamps to the network node.

In some embodiments, the wireless device comprises one or more transmitters, one or more receivers, and processing circuitry associated with the one or more transmitters and the one or more receivers. The processing circuitry is configured to cause the wireless device to, while in the dormant state, perform the one or more idle mode measurements and store the one or more idle mode measurements with the associated measurement timestamps. The processing circuitry is further configured to cause the wireless device to receive the message from a network node that initiates the transition of the wireless device from the dormant state to the connected state and send the one or more idle mode measurements and the associated measurement timestamps to the network node.

Embodiments of a method performed by a network node are also disclosed. In some embodiments, a method performed by a network node to enable determination of a validity of one or more idle mode measurements performed for a cellular communications network comprises sending, to a wireless device, a validity time value for idle mode measurements.

In some embodiments, sending the validity time value for idle mode measurements comprises sending, to the wireless device, an idle mode measurement configuration comprising the validity time value. In some embodiments, the idle mode measurement configuration comprises the validity time value and a measurement duration value. In some embodiments, the measurement duration value indicates a first amount of time during which the wireless device is to perform idle mode measurements starting from a time of receipt of the idle mode measurement configuration. In some embodiments, the validity time value indicates a second amount of time for which idle mode measurements performed by the wireless device are valid, the second amount of time being relative to an end of a period of time during which the wireless device performs idle mode measurements, wherein the period of time during which the wireless device performs idle mode measurements has a duration equal to the first amount of time indicated by the measurement duration value.

In some embodiments, the validity time value indicates an amount of time for which idle mode measurements performed by the wireless device are valid, the amount of time being relative to a time at which the wireless device starts performing the idle mode measurements.

Embodiments of a network node are also disclosed. In some embodiments, a network node to enable determination of a validity of one or more idle mode measurements performed for a cellular communications network is adapted to send, to a wireless device, a validity time value for idle mode measurements.

In some embodiments, the network node comprises a communication interface and processing circuitry associated with the communication interface. The processing circuitry is configured to cause the network node to send the validity time value for idle mode measurements to the wireless device.

In some embodiments, a method performed by a network node for determining a validity of one or more idle mode measurements performed for a cellular communications network comprises sending, to a wireless device, an idle mode measurement configuration and receiving, from the wireless device, one or more idle mode measurements and associated measurement timestamps, wherein the associated measurement timestamps indicate an amount of time since the one or more idle mode measurements were made by the wireless device.

In some embodiments, the method further comprises utilizing the one or more idle mode measurements if the amount of time since the one or more idle mode measurements were made by the wireless device, as indicated by the associated measurement timestamps, is less than a predefined or preconfigured threshold amount of time.

In some embodiments, the method further comprises discarding the one or more idle mode measurements if the amount of time since the one or more idle mode measurements were made by the wireless device, as indicated by the associated measurement timestamps, is greater than a predefined or preconfigured threshold amount of time.

In some embodiments, a network node for determining a validity of one or more idle mode measurements performed for a cellular communications network is adapted to send, to a wireless device, an idle mode measurement configuration and receive, from the wireless device, one or more idle mode measurements and associated measurement timestamps, wherein the associated measurement timestamps indicate an amount of time since the one or more idle mode measurements were made by the wireless device.

In some embodiments, the network node comprises a communication interface and processing circuitry associated with the communication interface. The processing circuitry is configured to cause the network node to send the idle mode measurement configuration to the wireless device and receive the one or more idle mode measurements and associated measurement timestamps from the wireless device.

In some embodiments, a method performed by a network node for determining a validity of one or more idle mode measurements performed for a cellular communications network comprises sending, to a wireless device, an idle mode measurement configuration and storing timing information that indicates a time at which the wireless device transitioned from a connected state to a dormant state in which one or more idle mode measurements are performed by the wireless device in accordance with the idle mode measurement configuration.

In some embodiments, the method further comprises sending the timing information to another network node.

In some embodiments, storing the timing information comprises storing the timing information in a User Equipment (UE) Access Stratum (AS) context of the wireless device.

In some embodiments, a network node for determining of a validity of one or more idle mode measurements performed for a cellular communications network is adapted to send, to a wireless device, an idle mode measurement configuration and store timing information that indicates a time at which the wireless device transitioned from a connected state to a dormant state in which one or more idle mode measurements are performed by the wireless device in accordance with the idle mode measurement configuration.

In some embodiments, the network node comprises a communication interface and processing circuitry associated with the communication interface. The processing circuitry is configured to cause the network node to send the idle mode measurement configuration to the wireless device and store the timing information that indicates the time at which the wireless device transitioned from the connected state to the dormant state in which the one or more idle mode measurements are performed by the wireless device in accordance with the idle mode measurement configuration.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 1 shows a schematic control plane architecture for Long Term Evolution (LTE) Dual Connectivity (DC) and Evolved Universal Terrestrial Radio Access (E-UTRA) New Radio (NR) DC (EN-DC);

FIGS. 18 through 21 are flowcharts illustrating embodiments of a method implemented in a communication system.

DETAILED DESCRIPTION

Figure 2:
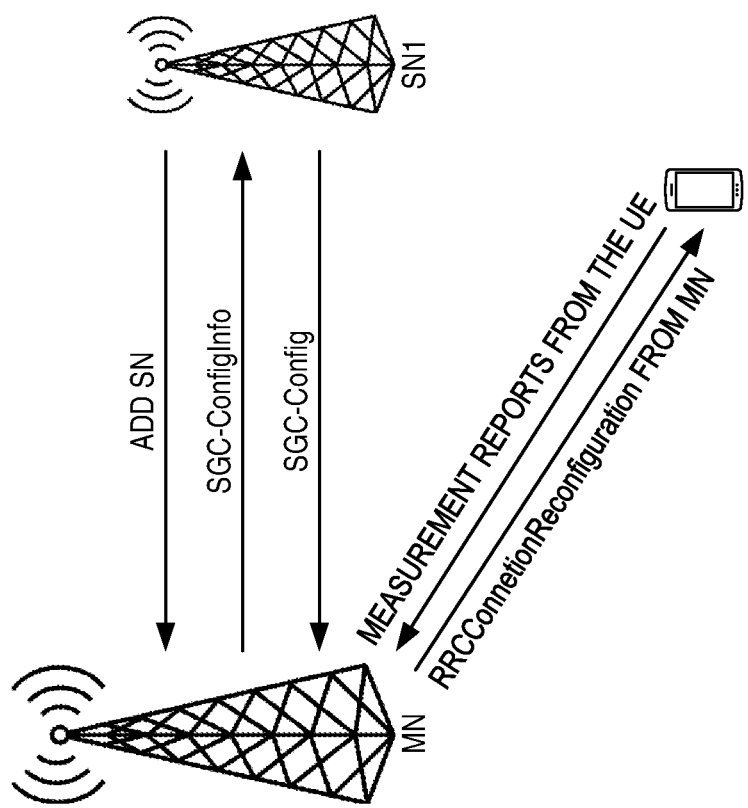
FIG. 2 illustrates an overview of LTE DC configurations.
Figure 3:
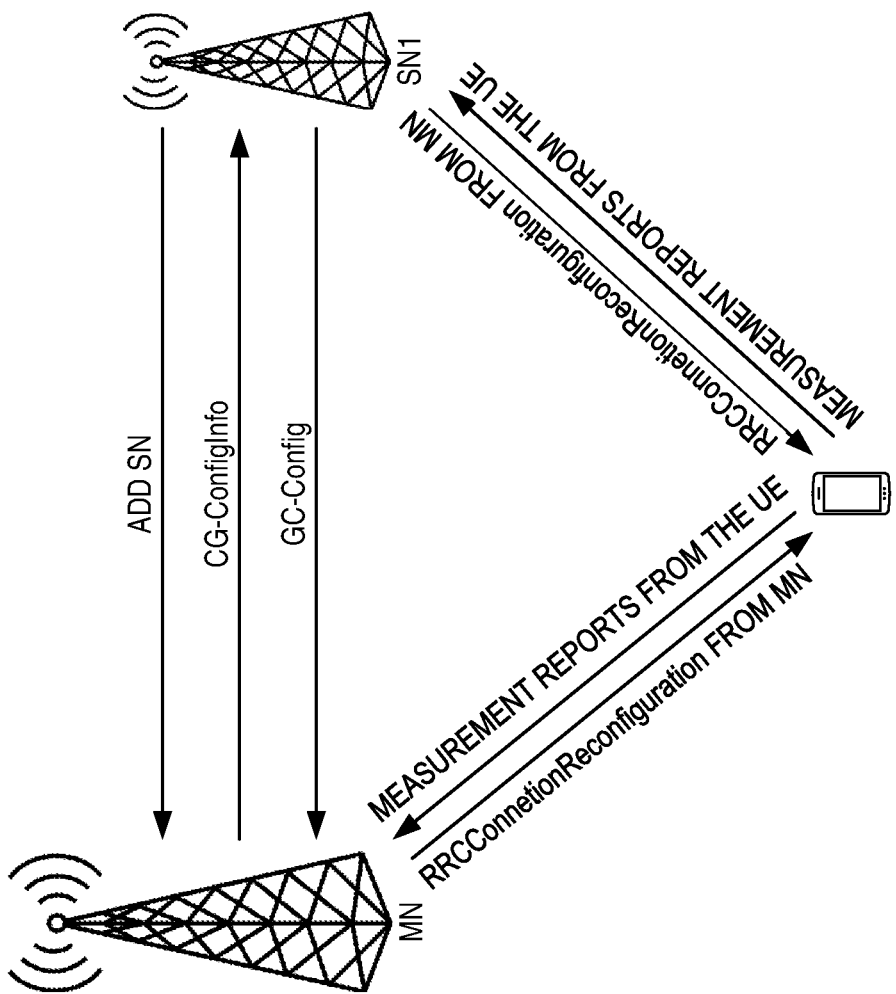
FIG. 3 illustrates an overview of EN-DC configurations.
Figure 4:
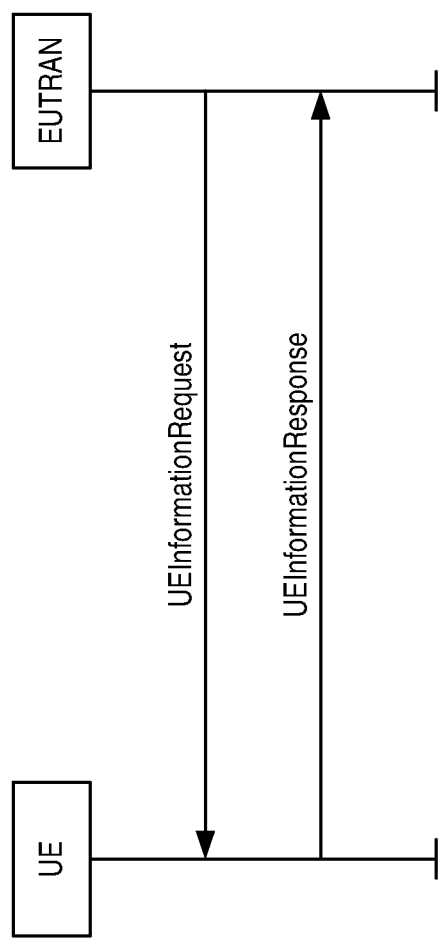
FIG. 4 illustrates a User Equipment (UE) information request and response procedure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) relating to idle mode measurements. Currently, the idle mode measurements rely on UE implementation. For example, if the idle mode measurement was configured via System Information Block 5 (SIB5) (i.e., broadcasted instead of dedicated), in the current LTE early measurement solution, there is no timer information telling the UE how long it has to keep measuring. Even in the case of dedicated idle mode configuration upon release, the dedicated idle mode configuration contains a timer that indicates how long the UE should measure in idle mode; it is still up to implementation for how long the UE will keep the measurements, as the current specifications mandate the release of VarMeasIdleReport that includes the idle mode measurement results only on sending of the results with UEInformationResponse. The problem with this is that the network may end up receiving a measurement result that is too old and not relevant to the current radio conditions and it could configure the UE with Carrier Aggregation (CA)/Dual Connectivity (DC) that is not optimal (or, in the worst case, could even lead to failure to add CA/DC).

Certain aspects of the present disclosure and their embodiments may provide solutions to the aforementioned or other challenges. Embodiments of the present disclosure propose the following mechanisms to ensure that only relevant IDLE mode measurements are considered and used for reconfiguring the UE appropriately when a UE transits from a dormant state (e.g., suspended in IDLE or INACTIVE) to a connected stated (e.g., CONNECTED state).

At the UE side, one or more of the following mechanisms are provided.

The UE saves a timestamp (e.g., in the UE Access Stratum (AS) Inactive context that it is saving) when being suspended (e.g., via Radio Resource Control (RRC) (connection) release).

The UE is provided with an additional timer parameter (referred to herein as validity_time) in an idle measurement configuration to indicate how long the UE is to keep idle mode measurements after a timer (e.g., a timer that is started upon receiving a message to suspend or release the UE including an idle measurement configuration such as, e.g., time T331) has expired. This additional timer is referred to herein as Txxx. The other timer is, for the example embodiments described herein, the T331 timer, but is not limited thereto.

The UE starts the additional timer Txxx when T331 expires with the validity_time value. When the additional timer Txxx expires, the UE will delete idle mode measurement information (e.g., delete the VarMeasIdleReport which includes idle mode measurement information). Another option is to start the additional timer Txxx when receiving it (i.e., at the same time as starting the timer T331). If Txxx is larger than T331, then when T331 expires, only Txxx will be running. If Txxx expires, the UE deletes the idle mode measurement information (e.g., deletes the VarMeasIdleReport which includes the idle mode measurement information).

Another option is not to not keep any new timer, but when the UE transitions to CONNECTED (e.g., upon sending a setup/resume request), the UE checks if the age of the idle measurement is more than the validity_time (i.e., current time−(timestamp of Inactive UE context+T331))>validity_time). If so, the UE will delete idle mode measurement information (e.g., delete the VarMeasIdleReport which includes idle mode measurement information).

If idle mode measurement information is not available (e.g., if varMeasId/eReport is not available), the UE will not indicate idle mode measurement availability (e.g., Setup Complete or Resume complete messages).

At the network side (e.g., at the base station or eNB), one or more of the following mechanisms are provided.

The network (e.g., a network node such as, e.g., a base station such as, e.g., an eNB) saves a timestamp (e.g., in the UE AS Inactive context (or along with the UE AS Inactive context)) that is stored when it suspends a UE.

If the UE resumes at a network node other than the source network node where the UE got suspended:
   Option 1: The UE AS context Information Element (IE) that is passed in the UE context fetch response is modified to include the time information (e.g., the timestamp).
   Option 2: The UE AS context is not modified, but a new IE is added in the UE context fetch response message to include the time information (e.g., the timestamp).

The target network node decides to request idle measurement or not depending on how long the UE has been in inactive (or how old the measurements are, measurement age=current time−(timestamp+T331)).

If the UE resumes in another node, the target network node can receive the time information from the source network node.

In some embodiments, a method in a network (e.g., in a network node) comprises at least one of the following actions:
   providing a UE with a validity time, which is a value that indicates how long idle mode measurement configurations can be considered to be valid, where the validity time could either be a relative time or an absolute time, and
   providing a target network node with time information related to the UE Inactive AS context, to assess the validity of the UE's idle mode measurement configurations.

In some embodiments, a method in the UE comprises at least one of the following actions:
   receiving an indication (e.g., in a release message) of how long to consider idle mode measurement configurations to be valid,
   upon establishing or resuming a connection, evaluating, based on the received indication (i.e., the received timer value), whether idle mode measurements are still valid and, in some embodiments, whether to indicate or not indicate to the network that the UE has the idle mode measurements, and
   if the validity timer for the measurement configurations expires, the UE releases them (e.g., the UE deletes the idle mode measurements).

Certain embodiments may provide one or more of the following technical advantage(s). Unnecessary reporting of old measurements is prevented, ensuring that measurements performed during IDLE mode are used only if they are still relevant.

Figure 5:
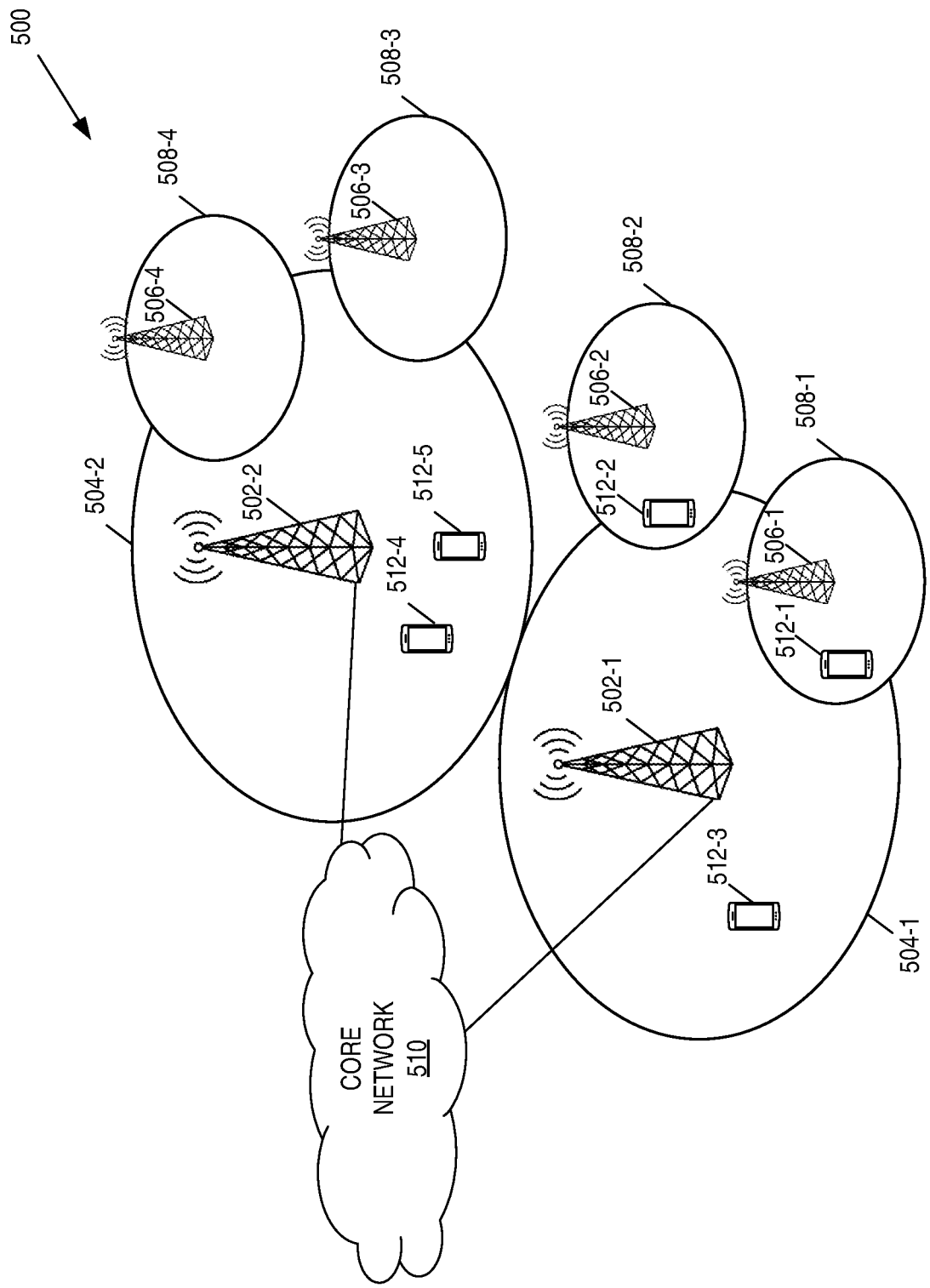
FIG. 5 illustrates one example of a cellular communications network in which embodiments of the present disclosure may be implemented.

Systems and methods are disclosed herein for ensuring that only relevant idle mode measurements are considered and used for reconfiguring a UE appropriately when the UE transitions from a dormant state (e.g., suspended in IDLE or INACTIVE) to a connected stated (e.g., CONNECTED state). In this regard, FIG. 5 illustrates one example of a cellular communications network 500 in which embodiments of the present disclosure may be implemented. In the embodiments described herein, the cellular communications network 500 is an LTE or 5G NR network. In this example, the cellular communications network 500 includes base stations 502-1 and 502-2, which in LTE are referred to as eNBs and in 5G NR are referred to as gNBs, controlling corresponding macro cells 504-1 and 504-2. The base stations 502-1 and 502-2 are generally referred to herein collectively as base stations 502 and individually as base station 502. Likewise, the macro cells 504-1 and 504-2 are generally referred to herein collectively as macro cells 504 and individually as macro cell 504. The cellular communications network 500 may also include a number of low power nodes 506-1 through 506-4 controlling corresponding small cells 508-1 through 508-4. The low power nodes 506-1 through 506-4 can be small base stations (such as pico or femto base stations) or Remote Radio Heads (RRHs), or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The base stations 502 (and optionally the low power nodes 506) are connected to a core network 510.

The base stations 502 and the low power nodes 506 provide service to wireless devices 512-1 through 512-5 in the corresponding cells 504 and 508. The wireless devices 512-1 through 512-5 are generally referred to herein collectively as wireless devices 512 and individually as wireless device 512. The wireless devices 512 are also sometimes referred to herein as UEs.

Now, a discussion will be provided regarding some specific example embodiments. Note that the embodiments disclosed herein are equally applicable for both LTE and NR. However, most of the description below refers to LTE for illustrative purposes. Note, however, that idle mode measurements have not yet been specified in 3GPP NR standards (e.g., 3GPP Technical Specification (TS) 38.331), but such measurements may be introduced in the future. Also note that the names of the specific messages (e.g., RRC messages) referred to below for LTE (3GPP TS 36.331) are not necessarily the same as the names of the corresponding messages (e.g., RRC messages) in NR (3GPP TS 38.331). The names of the messages in NR have oftentimes been shortened compared to the corresponding message in LTE, e.g., by removing the word "Connection". For example, LTE uses the name "RRCConnectionRelease" whereas NR uses the name "RRCRelease"; LTE uses the name "RRCConnectionSetup" whereas NR uses the name "RRCSetup"; LTE uses the name "RRCConnectionResumeRequest" whereas NR uses the name "RRCResumeRequest" or "RRCResumeRequest1"; etc. As such, it should be noted that the detailed examples given herein for specific RRC messages can also be implemented in the corresponding RRC messages in NR.

1 UE Embodiments 1.1 Save Current Time when Receiving Configurations and Release Too Old Configurations/Reports In some embodiments, the UE, upon getting suspended, saves the current time in a UE Inactive timestamp. The following examples show how this can be captured in 3GPP TS 36.331 and 3GPP TS 38.331 (additions/changes are bolded and underlined):

3GPP TS 36.331:
5.3.8.7 UE actions upon entering RRC_INACTIVE
Upon entering RRC_INACTIVE, the UE shall:
   <<skipped parts>>
   1> if the RRCConnectionRelease message was received in response to an
     RRCConnectionResumeRequest.
     2>    in the stored UE Inactive AS context:
        3>   replace the $K_{eNB}$ and $K_{RRCint}$ keys with the current $K_{eNB}$ and $K_{RRCint}$ keys;
        3>   replace the C-RNTI with the temporary C-RNTI which the UE has used
            to receive the RRCConnectionRelease message;
        3>   replace the cellIdentity with the cellIdentity of the PCell at the time the
            UE has received the RRCConnectionRelease message;
        3>   replace the previously stored physical cell identity with the physical cell
            identity of the PCell at the time the UE has received the
            RRCConnectionRelease message;
        4>replace the rrc-InactiveConfig with the current rrc-InactiveConfig;
        3>   replace the previously stored UE context time with the current time;
   1> else:
     2>    in the UE Inactive AS Context, store the received rrc-InactiveConfig,
        all current parameters configured with RRCConnectionReconfiguration or
        RRCConnectionResume, the current $K_{eNB}$ and $K_{RRCint}$ keys, the ROHC state, the
        C-RNTI used in the source PCell, the cellIdentity and the physical cell identity
        of the source PCell, and the current time;
   <<skipped parts>>

*******************************************************************
*****

5.3.12 UE actions upon leaving RRC_CONNECTED or RRC_INACTIVE
Upon leaving RRC_CONNECTED or RRC_INACTIVE, the UE shall:
   <<skipped parts>>
   1> if leaving RRC_CONNECTED was triggered by suspension of the RRC:
     2>    re-establish RLC entities for all SRBs and DRBs, including RBs configured
        with NR PDCP;
     2>    store the UE AS Context including the current RRC configuration, the
        current security context, the PDCP state including ROHC state, C-RNTI used in
        the source PCell, the cellIdentity and the physical cell identity of the source
        PCell, and the current time;
<<skipped parts>>

---

3GPP TS 38.331:
5.3.8.3 Reception of the RRCRelease by the UE

The UE shall:
   < <skipped parts> >
   1> if the RRCRelease includes suspendConfig:
     2>   apply the received suspendConfig;
     2>   reset MAC and release the default MAC Cell Group configuration, if any;
     2>   re-establish RLC entities for SRB1;
     2>   if the RRCRelease message with suspendConfig was received in
        response to an RRCResumeRequest or an RRCResumeRequest1:
        3>   stop the timer T319 if running;
        3>   in the stored UE Inactive AS context:
           4>replace the $K_{gNB}$ and $K_{RRCint}$ keys with the current $K_{gNB}$ and $K_{RRCint}$ keys;
           4>replace the C-RNTI with the temporary C-RNTI in the cell the UE has
              received the RRCRelease message;
           4>replace the cellIdentity with the cellIdentity of the cell the UE has
              received the RRCRelease message;
           4>replace the physical cell identity with the physical cell identity of the cell
              the UE has received the RRCRelease message;
           4>replace the suspendConfig with the current suspendConfig;
           4>   replace the previously stored UE context time with the current time;
     2>   else:
        3>   store in the UE Inactive AS Context the received suspendConfig, all
           current parameters configured with RRCReconfiguration or RRCResume,
           the current $K_{gNB}$ and $K_{RRCint}$ keys, the ROHC state, the C-RNTI used in the
           source PCell, the cellIdentity and the physical cell identity of the source
           PCell, and the current time;
   < <skipped parts> >

Note that the current time above can be a clock time, a frame/slot number, or any other parameter/counter than can be used to uniquely identify the time when the UE got suspended.

In one embodiment, the UE is provided with additional timer parameter (e.g., validityTime) in the idle measurement configuration to indicate how long the UE keeps the idle mode measurements after T331 has expired. An example realization of the above for LTE is shown below:

```
MeasIdleConfigDedicated-r15 ::= SEQUENCE {
   measIdleCarrierListEUTRA-r15    EUTRA-CarrierList-r15    OPTIONAL,
   -- Need OR
   measIdleDuration-r15            ENUMERATED {sec10, sec30, sec60, sec120,
                                   sec180, sec240, sec300, spare},
   ...,
   validityTime-r16                ENUMERATED {sec10, sec30, sec60, sec120,
                                   sec180, sec240, sec300, spare}
}
```

Note that the validityTime values above are just examples and higher or lower values could be specified. Another possibility is to use an absolute time, e.g. using the AbsoluteTimeInfo IE defined in LTE, which is a 48 bit long IE that can store the time in YY-MM-DD HH:MM:SS format. This way could be used to communicate the exact time the idle measurements expire.

1.1.1 Using a New Timer

In one example embodiment, the UE will start this timer (e.g., Txxx) when T331 expires with the validityTime value, and will delete the VarMeasIdleReport when this timer expires. The following example shows how this can be captured in 3GPP TS 36.331 and 3GPP TS 38.331:

```
5.6.20.3   T331 expiry or stop
The UE shall:
   1> if T331 expires or is stopped:
      2>    release the VarMeasIdleConfig;
      2> start Txxx with the value of validityTime;
      NOTE: It is up to UE implementation whether to continue IDLE
            mode measurements according to SIB5 configuration after
            T331 has expired or stopped.
5.6.20.4   Txxx expiry
The UE shall:
   1> if Txxx expires:
      2> discard the VarMeasIdleReport;
5.3.3.4    Reception of the RRCConnectionSetup by the UE
   NOTE 1:  Prior to this, lower layer signalling is used to allocate a
            C-RNTI. For further details see TS 36.321 [6];
The UE shall:
   <<skipped parts>>
   1> set the content of RRCConnectionSetupComplete message as
      follows:
      <<skipped parts>>
         2>     if the UE is connected to EPC:
            3>     except for NB-IoT:
               <<skipped parts>>
               4>if the SIB2 contains idleModeMeasurements, and the UE
                  has IDLE mode measurement information available in
                  VarMeasIdleReport,
                  5>    include the idleMeasAvailable;
               4>stop T331 (if running);
               4> stop Txxx (if running);
               <<skipped parts>>
```

Figure 6:
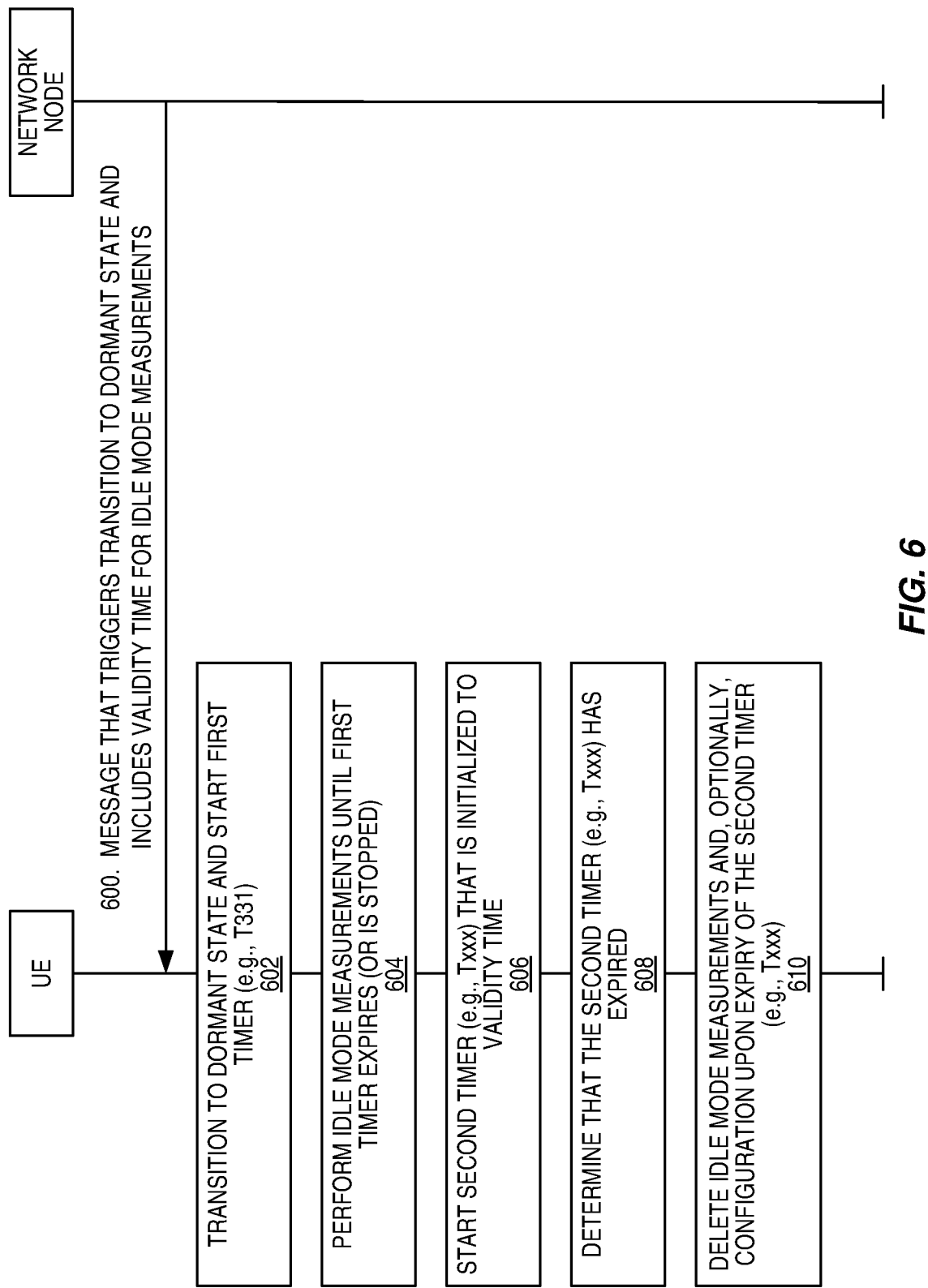
FIGS. 6 through 9 illustrate the operation of a UE and a network node in accordance with various embodiments of the present disclosure.

FIG. 6 illustrates the operation of a UE and a network node in accordance with some embodiments of the present disclosure. FIG. 6 illustrates at least some of the aspects described above with respect to the validity time and the timer Txxx. As illustrated, the UE receives a message (e.g., a RRC Connection Release) that triggers the UE to transition from the connected state to a dormant state (e.g., idle mode or suspended mode) (step 600). In this example, the message includes an idle mode measurement configuration that includes a measurement duration time (e.g., a timer value for the T331 timer) and a validity time value (i.e., a timer value for the Txxx timer). Note that, in some other embodiments, the validity time value may be signaled to the UE in another manner, e.g. via a separate message, via broadcast signaling, or using a value predefined or otherwise specified, e.g., by a 3GPP specification. Upon receiving the message of step 600, the UE transitions from the connected state to the dormant state and, in this example, starts a first timer (e.g., the T331 timer) (step 602).

While in the dormant state, the UE performs one or more idle mode measurements in accordance with the idle mode measurement configuration (step 604). In this example, once the first timer expires, the UE stops performing idle mode measurements and starts a second timer (e.g., the Txxx timer) that is initialized to the received validity time value (step 606). Further, in this example, the second timer expires before the UE is triggered to transition back to the connected state (e.g., prior to receiving a RRCConnectionSetup or RRCConnectionResume message from a network node or prior to transmitting a RRC Connection Setup Request or RRC Connection Resume Request). As such, the UE determines that the second timer has expired (step 608). Once the second timer expires, the UE deletes the idle mode measurements (e.g., deletes a report(s) containing the idle mode measurements) and, in some embodiments, the idle mode measurement configuration (step 610). By deleting the idle mode measurements, the UE ensures that the idle mode measurements (which now may be too old) are not reported to the network when the UE transitions from the dormant state back to the connected state.

Note that in the above realizations it has been assumed that the validityTime is to be accounted for after T331 has expired or stopped. However, it is possible to also envision an embodiment where the validityTime is an absoluteTime from the start of when the UE gets suspended. In that case, for the first option where a timer is defined and associated with the validityTime, the timer is started at the same time as T331 (i.e., when the UE gets suspended). An example realization for such a case is shown below (5.6.20.4 will remain the same as above).

```
5.3.8.3    Reception of the RRCConnectionRelease by the UE
The UE shall:
   <<skipped parts>>
   1> if the RRCConnectionRelease message includes the measIdleConfig:
      2>    clear VarMeasIdleConfig and VarMeasIdleReport,
      2>    store the received measIdleDuration in VarMeasIdleConfig;
      2>    start T331 with the value of measIdleDuration;
      2> start Txxx with the value of validityTime;
   <<skipped parts>>
```

The handling of the reception of the RRCConnectionSetup by the UE can be as before for the case where the timer was started after the expiry of T331.

Figure 7:
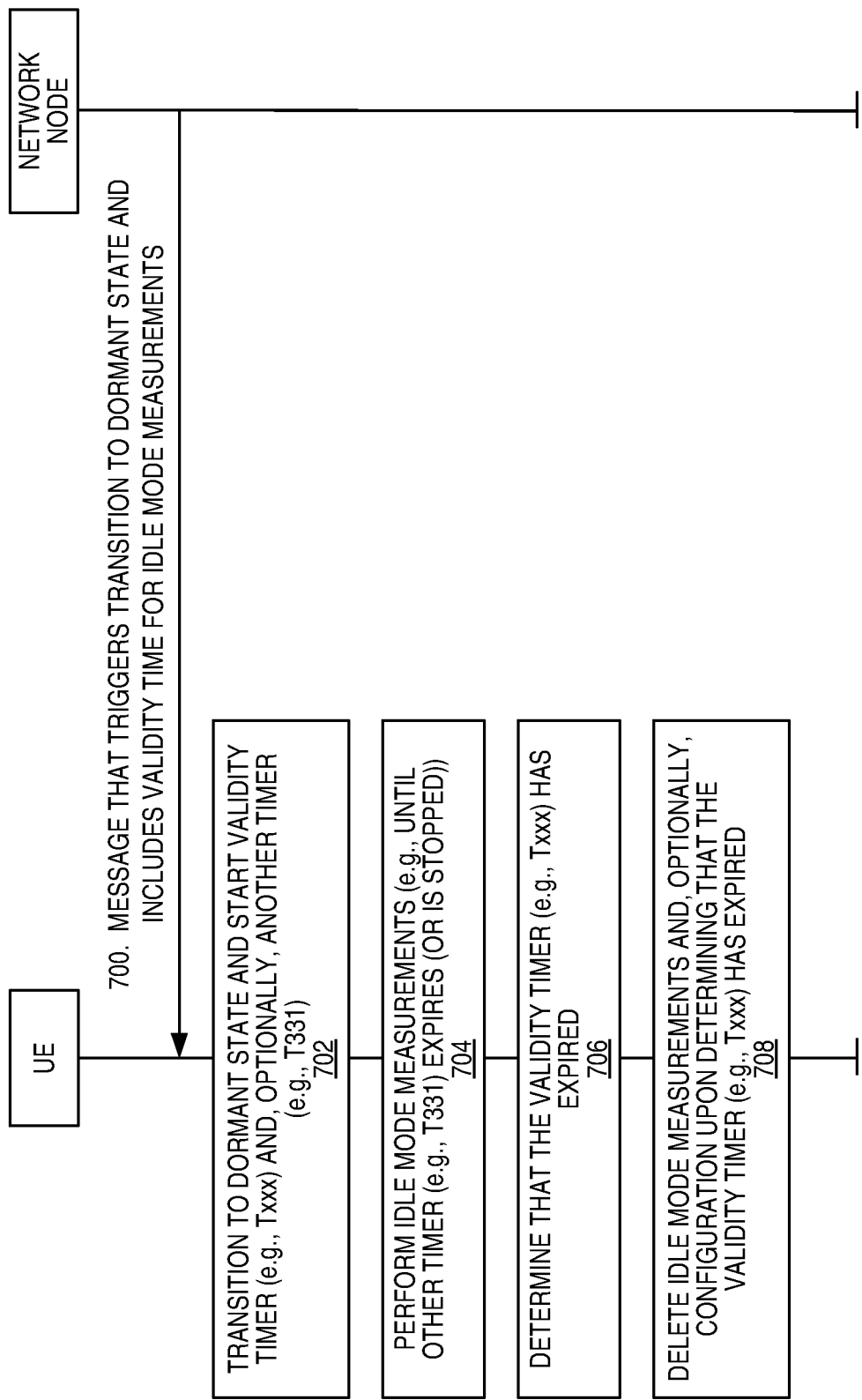

FIG. 7 illustrates the operation of a UE and a network node in accordance with some embodiments of the present disclosure. FIG. 7 illustrates at least some of the aspects described above with respect to the validity time and the timer Txxx. As illustrated, the UE receives a message (e.g., a RRC Connection Release) that triggers the UE to transition from the connected state to a dormant state (e.g., idle mode or suspended mode) (step 700). In this example, the message includes an idle mode measurement configuration that includes a measurement duration time (e.g., a timer value for the T331 timer) and a validity time value (i.e., a timer value for the Txxx timer). Note that, in some other embodiments, the validity time value may be signaled to the UE in another manner, e.g. via a separate message, via broadcast signaling, or using a value predefined or otherwise specified, e.g., by a 3GPP specification. Upon receiving the message of step 700, the UE transitions from the connected state to the dormant state and, in this example, starts a timer (e.g., the Txxx timer which is referred to here as a validity timer) that is initialized to the validity time value (step 702). In addition, the UE may start another timer (e.g., the T331 timer).

While in the dormant state, the UE performs one or more idle mode measurements in accordance with the idle mode measurement configuration (step 704). In this example, the UE stops performing idle mode measurements (e.g., upon expiry of the T331 timer). Further, in this example, the validity timer expires before the UE is triggered to transition back to the connected state (e.g., prior to receiving a RRC Connection Setup or RRC Connection Resume message from a network node or prior to transmitting a RRC Connection Setup Request or RRC Connection Resume Request). As such, the UE determines that the validity timer has expired (step 706). Once the validity timer expires, the UE deletes the idle mode measurements (e.g., deletes a report(s) containing the idle mode measurements) and, in some embodiments, the idle mode measurement configuration (step 708). By deleting the idle mode measurements, the UE ensures that the idle mode measurements (which may now be too old) are not reported to the network when the UE transitions from the dormant state back to the connected state.

1.1.2 Checking Validity of Measurements During Connection Setup Complete Preparation Another option is to not keep any new timer but, when the UE transitions to RRC_CONNECTED (upon sending a setup/resume request), the UE checks if the age of the idle measurement is more than the validity time (i.e., current time−(timestamp of Inactive UE context+T331))>validity_time). If so, VarMeasIdleReport will be deleted. An example where a timer is not started is shown below (5.6.20.3 will remain as in legacy and 5.6.20.4 will not be needed).

---

5.3.3.4 Reception of the RRCConnectionSetup by the UE
The UE shall:
  <<skipped parts>>
  1> set the content of RRCConnectionSetupComplete message as follows:
    <<skipped parts>>
    2>  if the UE is connected to EPC:
      3>  except for NB-IoT:
        <<skipped parts>>
        4>if the SIB2 contains idleModeMeasurements, and the UE has IDLE mode measurement information available in VarMeasIdleReport,
          5> except if more time has elapsed than the validityTime configured in the previous RRCConnectionRelease since the last time the UE got suspended and T331 has been stopped or expired:
            6> include the idleMeasAvailable;
        4>stop T331 (if running);
        <<skipped parts>>

---

And for the case where the validityTime is an absoluteTime from the start of when the UE gets suspended, the realization could be something like below.

---

5.3.3.4 Reception of the RRCConnectionSetup by the UE

The UE shall:
  < <skipped parts> >
  1> set the content of RRCConnectionSetupComplete message as follows:
    < <skipped parts> >
    2>  if the UE is connected to EPC:
      3>  except for NB-IoT:
        < <skipped parts> >
        4>if the SIB2 contains idleModeMeasurements, and the UE has IDLE mode measurement information available in VarMeasIdleReport,
          5> except if more time has elapsed than the validityTime configured in the previous RRCConnectionRelease since the last time the UE got suspended:
            6>include the idleMeasAvailable;
        4>stop T331 (if running);
        4>if the UE has flight path information available:
          5>  include flightPathInfoAvailable;
      3>  for NB-IoT:
        4>if the UE supports serving cell idle mode measurements reporting and servingCellMeasInfo is present in SystemInformationBlockType2-NB:
          5>  set the measResultServCell to include the measurements of the serving cell;

| 5.3.3.4 Reception of the RRCConnectionSetup by the UE |
|---|

Figure 8:
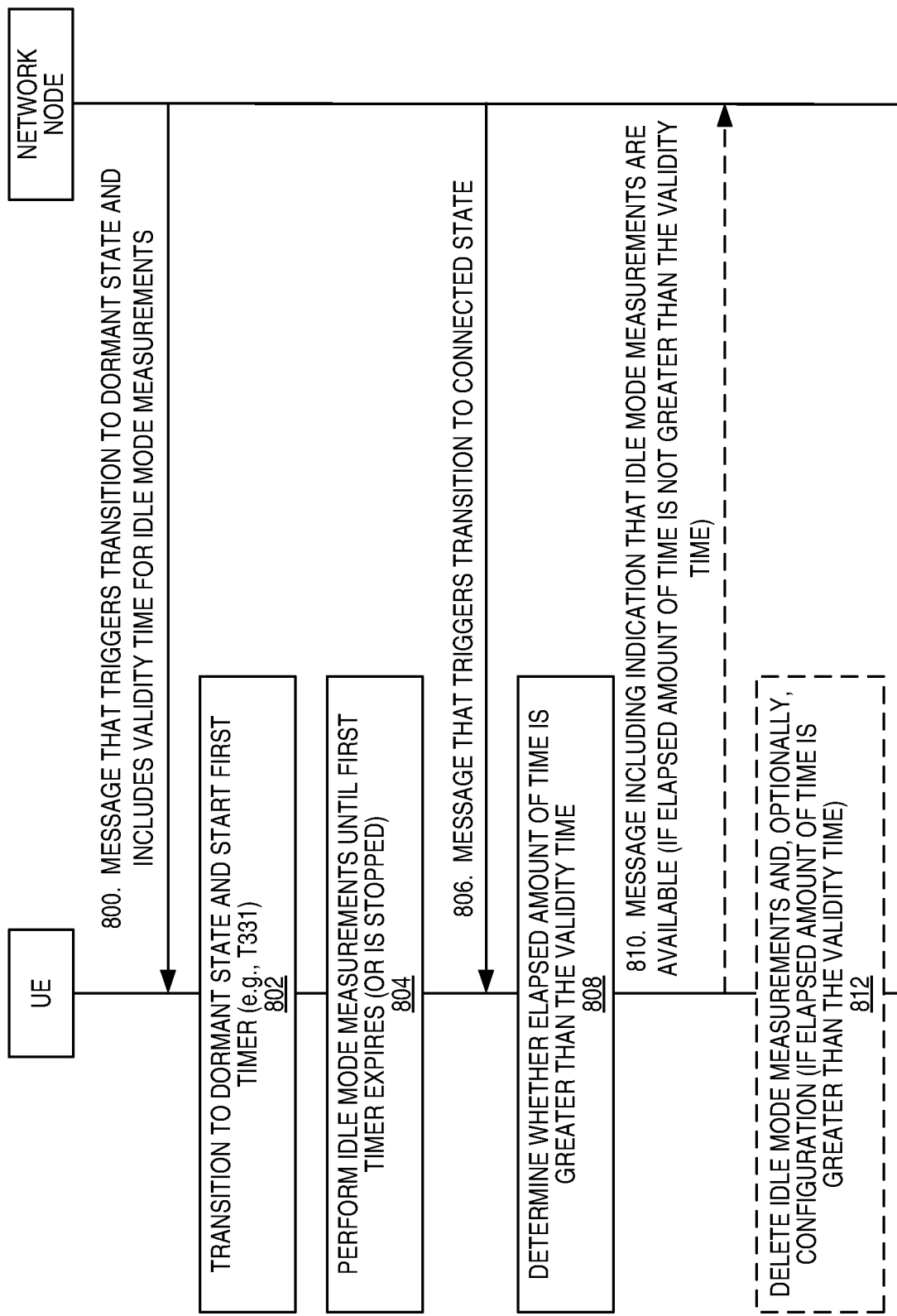

NOTE 2: The UE includes the latest results of the serving cell measurements as used for cell selection/reselection evaluation, which are performed in accordance with the performance requirements as specified in TS 36.133 [16].
   3> include dcn-ID if a DCN-ID value (see TS 23.401 [41]) is received from upper layers;
  2> if UE needs UL gaps during continuous uplink transmission:
   3> include ue-CE-NeedULGaps,
1> submit the RRCConnectionSetupComplete message to lower layers for transmission;
1> the procedure ends:

FIG. 8 illustrates the operation of a UE and a network node in accordance with some embodiments of the present disclosure. FIG. 8 illustrates at least some of the aspects described above with respect to the validity time. As illustrated, the UE receives a message (e.g., a RRC Connection Release) that triggers the UE to transition from the connected state to a dormant state (e.g., idle mode or suspended mode) (step 800). In this example, the message includes an idle mode measurement configuration that includes a measurement duration time (e.g., a timer value for the T331 timer) and a validity time value (i.e., a timer value for the Txxx timer). Note that, in some other embodiments, the validity time value may be signaled to the UE in another manner, e.g. via a separate message, via broadcast signaling, or using a value predefined or otherwise specified, e.g., by a 3GPP specification. Upon receiving the message of step 800, the UE transitions from the connected state to the dormant state and, in this example, starts a first timer (e.g., the T331 timer) (step 802). As discussed above, upon transitioning from the connected state to the dormant state, the UE also stores the current time as the timestamp of the inactive UE AS context.

While in the dormant state (and as long as the first timer has not expired or been stopped), the UE performs one or more idle mode measurements in accordance with the idle mode measurement configuration (step 804). In this example, the UE subsequently receives a message (e.g., an RRC connection setup or RRC Connection Resume) from the network node (or alternatively some other network node) (step 806). The UE determines whether an amount of time that has elapsed is greater than the validity time (step 808). More specifically, in some embodiments, the validity time is defined with respect to the expiry of the first timer (e.g., T331) and, as such, the UE determines whether the amount of time that has elapsed since the expiry of the first timer is greater than the validity time. As discussed above, the elapsed amount of time may be calculated as: current time−(timestamp of Inactive UE context+T331). The calculated elapsed amount of time is then compared to the validity time. In some other embodiments, the validity time is defined with respect to the start of the first timer (i.e., with respect to when the UE transitions to the dormant state) and, as such, the UE determines whether the amount of time that has elapsed since the UE transitioned to the dormant state is greater than the validity time. As discussed above, the elapsed amount of time may be calculated as: current time−timestamp of Inactive UE context. The calculated elapsed amount of time is then compared to the validity time. In the illustrated example, the UE makes the determination of step 808 after receiving the message in step 806. However, in an alternative embodiment, the UE makes the decision prior to initiating a transmission that triggers the message of step 806 (e.g., prior to initiating transmission of an RRC Connection Setup Request or RRC Connection Resume Request).

If the elapsed amount of time is not greater than the validity time, the UE sends, in this example, a message that includes an indication that idle mode measurements are available to the network node (step 810). In addition or alternatively, the UE sends the idle mode measurements to the network node. Conversely, if the elapsed amount of time is greater than the validity time: (a) the UE does not indicate, to the network node, that idle mode measurements are available and (b) optionally, the UE deletes the idle mode measurements (e.g., deletes a report(s) containing the idle mode measurements) and, optionally, the idle mode measurement configuration (step 812). In this manner, the UE ensures that idle mode measurements that may be too old are not reported to the network when the UE transitions from the dormant state back to the connected state.

1.1.3 Other Considerations

Note that the above examples focused on the RRC connection setup procedure and the decision whether to indicate idle mode measurement availability in the RRC Connection Setup Complete message. A similar approach could be taken in RRC connection resume procedure and the decision whether to include the idle mode measurement availability in the RRC Connection Resume Complete message.

Note also that in the above examples it is assumed that there is a separate validityTime that is different from the idleDuration time (which was used to control the time the UE keeps measuring). Another possibility is to use only the idleDuration time and when that expires the UE discards not only the idle measurement configurations, but also the idle measurement reports.

1.2 Signal Time of Measurement Related to Time in Suspended Mode

In another embodiment, the UE, after receiving the RRC-ConnectionRelease message with the idle mode measurement configurations, starts a timer (also known as a stopwatch) Tyyy. Whenever the UE performs an idle mode measurement, it also stores the current time of the timer Tyyy. Unlike all other timers defined in TS 36.331 and TS.38.331, the timer Tyyy starts at 0 and increments to larger values. The UE procedures could be, e.g.,

| 5.6.20 Idle Mode Measurements |
|---|

5.6.20.1 General
This procedure specifies the measurements done by a UE in RRC_IDLE when it has an IDLE mode measurement configuration and the storage of the available measurements by a UE in both RRC_IDLE and RRC_CONNECTED.
5.6.20.2 Initiation
While T331 is running, the UE shall:
1> perform the measurements in accordance with the following:
   2> for each entry in measIdleCarrierListEUTRA within VarMeasIdleConfig:
     3> if UE supports carrier aggregation between serving carrier and the carrier frequency and bandwidth indicated by carrierFreq and allowedMeasBandwidth within the corresponding entry;
       4>perform measurements in the carrier frequency and bandwidth indicated by carrierFreq and allowedMeasBandwidth within the corresponding entry;
  NOTE: The fields s-NonIntraSearch in SystemInformationBlockType3 do not affect the UE measurement procedures in IDLE mode. How the UE performs measurements in IDLE mode is up to UE implementation as long as the requirements in TS 36.133 [16] are met for measurement reporting. UE is not required to perform idle measurements if SIB2 idle measurement indication is not configured.
       4>if the measCellList is included:
         5> consider PCell and cells identified by each entry within the measCellList to be applicable for idle mode measurement reporting;
       4>else
         5> consider PCell and up to maxCellMeasIdle strongest identified cells whose RSRP/RSRQ measurement results are above the value(s) provided in qualityThreshold (if any) to be applicable for idle mode measurement reporting;
       4>store measurement results for cells applicable for idle mode measurement reporting within the VarMeasIdleReport;
       4> <u>store current value of timer Tyyy within the measTime within the VarMeasIdleReport;</u>
     3> else:
       4>do not consider the carrier frequency to be applicable for idle mode measurement reporting;
1> if validilyArea is configured in VarMeasIdleConfig and UE reselects to a serving cell whose physical cell identity does not match any entry in validilyArea for the corresponding carrier frequency:
   2> stop T331;
- VarMeasIdleReport
The UE variable VarMeasIdleReport includes the logged measurements information.

| VarMeasIdleReport UE variable |
|---|

```
-- ASN1START
VarMeasIdleReport-r15 ::=SEQUENCE {
    measReportIdle-r15          MeasResultListIdle-r15
}
-- ASN1STOP
MeasResultIdle-r15 ::=SEQUENCE {
    measResultServingCell-r15       SEQUENCE {
        rsrpResult-r15              RSRP-Range,
        rsrqResult-r15              RSRQ-Range-r13
    },
    measResultNeighCells-r15    CHOICE {
        measResultIdleListEUTRA-r15     MeasResultIdleListEUTRA-r15,
        ...
    }
                                OPTIONAL,
    ...,
    [[ measTime                 INTEGER (0..4095)
    OPTIONAL
    ]]
}
```

| MeasResults field descriptions |
|---| meas Time
Indicates the time in seconds elapsed since the UE received the measIdleConfig In the example above, the measTime is in the format of seconds between 0 and 4095 seconds (i.e., ~68 minutes) coded as 12 bits. Any other coding is also possible, e.g. binary coded decimal in the format YY-MM-DD HH:MM:SS or a subset of that coding. In another embodiment, time ranges are used instead, e.g. 0-5 second, 5-10 second, >1 minute, etc.

Figure 9:
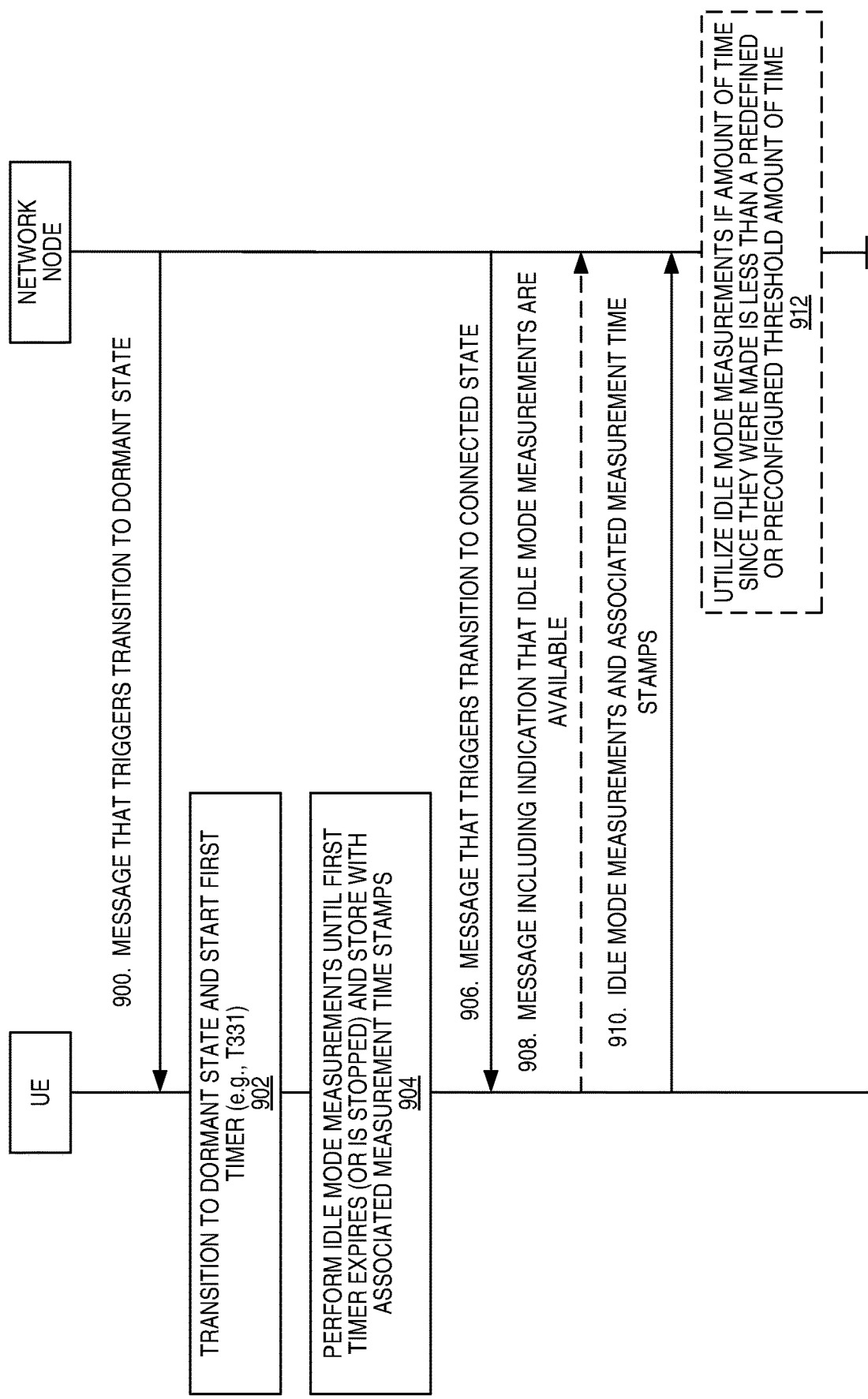

FIG. 9 illustrates the operation of a UE and a network node in accordance with some embodiments of the present disclosure. FIG. 9 illustrates at least some of the aspects described above. As illustrated, the UE receives a message (e.g., a RRC Connection Release) that triggers the UE to transition from the connected state to a dormant state (e.g., idle mode or suspended mode) (step 900). In this example, the message includes an idle mode measurement configuration that includes a measurement duration time (e.g., a timer value for the T331 timer). Upon receiving the message of step 900, the UE transitions from the connected state to the dormant state and, in this example, starts a first timer (e.g., the T331 timer) (step 902).

While in the dormant state (and as long as the first timer has not expired or been stopped), the UE performs one or more idle mode measurements in accordance with the idle mode measurement configuration (step 904). As described above, in this example, for each idle mode measurement, the UE stores an associated measurement timestamp. This measurement timestamp may be an absolute timestamp or a relative timestamp (e.g., relative to the time at which the UE transitioned to the dormant state). In this example, the UE subsequently receives a message (e.g., an RRC connection setup or RRC Connection Resume) from the network node (or alternatively some other network node) (step 906). Optionally, the UE sends, in this example, a message that includes an indication that idle mode measurements are available to the network node (step 908). The UE sends the idle mode measurements and the associated timestamps to the network node, e.g., in a respective report (step 910). Optionally, the network node utilizes the idle mode measurements if, as indicated by the associated measurement timestamps, the amount of time that has elapsed since the idle mode measurements were made is less than a predefined or preconfigured threshold amount of time (step 912). Otherwise, the network node discards the idle mode measurements.

2 Network Embodiments

Note that the network embodiments apply to the case of a UE resuming from RRC_INACTIVE (NR and LTE/5G Core (5GC), i.e., Evolved Universal Terrestrial Radio Access (E-UTRA) connected to 5GC) or suspended with context in IDLE (LTE/Evolved Packet Core (EPC), i.e., E-UTRA connected to EPC), while the UE embodiments apply to both IDLE to CONNECTED as well as IDLE with suspended/RRC_INACTIVE to CONNECTED transitions. In case the UE has been suspended to RRC_INACTIVE or RRC_IDLE with suspended RRC connection, when the UE resumes the connection and decides to indicate the idle mode measurements, e.g. in the RRCConnectionResumeComplete, the network would benefit from knowing how old these measurements may be. In order to do this, the stored UE context needs to be timestamped. If the UE resumes in another node than it was suspended in, this time information needs to be forwarded to the target node as well. Thus, the timestamp needs to be added to the UE context, or as an extra information to be sent in conjunction with the UE context.

2.1 Include Timestamp in UE Context

If the timestamp of the UE context is included in the context, then this timestamp needs to be signaled in, e.g., the AS-Config as shown below.

| AS-Config information element |
| --- |
| ``` |
| -- ASN1START |
| AS-Config ::=        SEQUENCE { |
|    sourceMeasConfig           MeasConfig, |
|    sourceRadioResourceConfig      RadioResourceConfigDedicated, |
|    sourceSecurityAlgorithmConfig   SecurityAlgorithmConfig, |
|    sourceUE-Identity          C-RNTI, |
|    sourceMasterInformationBlock   MasterInformationBlock, |
|    sourceSystemInformationBlockType1   SystemInformationBlockType1(WITH COMPONENTS |
|                                {..., nonCriticalExtension ABSENT}), |
|    sourceSystemInformationBlockType2   SystemInformationBlockType2, |
|    antennaInfoCommon              AntennaInfoCommon, |
|    sourceDl-CarrierFreq       ARFCN-ValueEUTRA, |
|    ..., |
|    [[  sourceSystemInformationBlockType1Ext   OCTET STRING (CONTAINING |
|                                SystemInformationBlockType1-v890-IEs) OPTIONAL, |
|       sourceOtherConfig-r9       OtherConfig-r9 |
|    -- sourceOtherConfig-r9 should have been optional. A target eNB compliant with this transfer |
|    -- syntax should support receiving an AS-Config not including this extension addition group |
|    -- e.g. from a legacy source eNB |
|    ]], |
|    [[  sourceSCellConfigList-r10   SCellToAddModList-r10   OPTIONAL |
|    ]], |
|    [[  sourceConfigSCG-r12        SCG-Config-r12   OPTIONAL |
|    ]], |
|    [[  as-ConfigNR-r15            AS-ConfigNR-r15 OPTIONAL |
|    ]], |
|    [[  absoluteTimeStamp-r16      AbsoluteTimeInfo-r10 OPTIONAL |
|    ]] |
| ``` |

| AS-Config information element |
|---|
| }<br>< < skipped parts > ><br>-- ASN1STOP |

2.2 Extend X2 Signaling to Include Timestamp

In another embodiment, the X2 signaling (in TS 36.423 [10] V15.4.0) or Xn signaling (TS 38.423) is extended to include a timestamp. The example below is for the case of X2:

9.1.2.29 RETRIEVE UE CONTEXT RESPONSE
This message is sent by the old eNB to transfer the UE context to the new eNB.
Direction: old eNB → new eNB.

| IE/Group Name | Presence | Range | IE type and reference | Semantics description | Criticality | Assigned Criticality |
|---|---|---|---|---|---|---|
| Message Type | M | | 9.2.13 | | YES | ignore |
| New eNB UE X2AP ID | M | | eNB UE X2AP ID 9.2.24 | Allocated at the new eNB | YES | ignore |
| New eNB UE X2AP ID Extension | O | | Extended eNB UE X2AP ID 9.2.86 | Allocated at the new eNB | YES | ignore |
| Old eNB UE X2AP ID | M | | eNB UE X2AP ID 9.2.24 | Allocated at the old eNB | YES | ignore |
| Old eNB UE X2AP ID Extension | O | | Extended eNB UE X2AP ID 9.2.86 | Allocated at the old eNB | YES | ignore |
| GUMMEI | M | | 9.2.16 | | YES | reject |
| UE Context Information | | 1 | | | YES | reject |
| >MME UE S1AP ID | M | | INTEGER (0 ... $2^{32} - 1$) | MME UE S1AP ID allocated at the MME | — | — |
| >UE Security Capabilities | M | | 9.2.29 | | — | — |
| >AS Security Information | M | | 9.2.30 | | — | — |
| >UE Aggregate Maximum Bit Rate | M | | 9.2.12 | | — | — |
| >Subscriber Profile ID for RAT/ Frequency priority | O | | 9.2.25 | | — | — |
| >E-RABs To Be Setup List | | 1 | | | — | — |
| >>E-RABs To Be Setup Item | | 1 ... <maxnoof Bearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>Bearer Type | O | | 9.2.92 | | — | — |
| >>>UL GTP Tunnel Endpoint | M | | GTP Tunnel Endpoint 9.2.1 | SGW endpoint of the S1 transport bearer. For delivery of UL PDUs. | YES | reject |
| >>DL Forwarding | O | | 9.2.5 | | YES | ignore |

-continued

| | | | | | |
|---|---|---|---|---|---|
| >RRC Context | M | | OCTET STRING | Includes either the RRC Handover Preparation Information message as defined in subclause 10.2.2 of TS 36.331 [9], or the HandoverPreparationInformation-NB message as defined in subclause 10.6.2 of TS 36.331 [9]. | — | — |
| >Absolute Time Stamp | O | | 9.2.xxx | Includes a BCD absolute time of when the UE Context was last updated in the format YY-MM-DD HH:MM:SS. | — | Ignore |

9.2.xxx Absolute Time Stamp
Absolute time info of when the UE Inactive AS context was last updated.

| IE/Group Name | Presence | Range | IE Type and Reference | Semantics Description |
|---|---|---|---|---|
| Absolute Time Stamp | M | | Bit string (48) | Absolute time in the format YY-MM-DD HH:MM:SS |

Note that the RRC Context included in the context response message contains the AS-config discussed above.

2.3 Procedure

Figure 10:
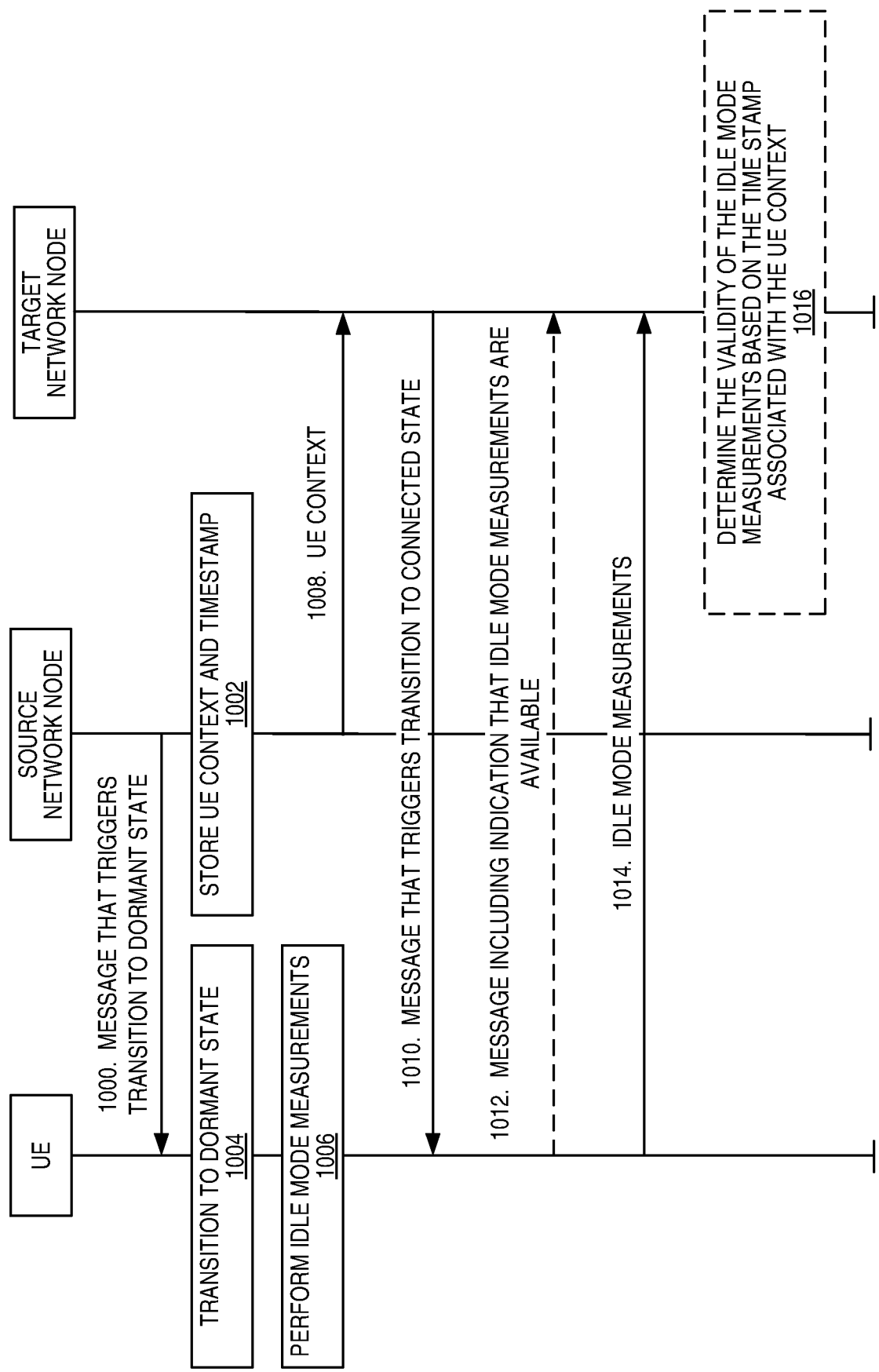
FIG. 10 illustrates the operation of a UE, a source network node, and a target network node in accordance with an embodiment of the present disclosure.

FIG. 10 illustrates the operation of a UE, a source network node, and a target network node in accordance with some embodiments of the present disclosure. FIG. 10 illustrates at least some of the aspects described above in Section 2. As illustrated, the UE receives a message (e.g., a RRC Connection Release) from the source network node that triggers the UE to transition from the connected state to a dormant state (e.g., idle mode or suspended mode) (step 1000). In this example, the message includes an idle mode measurement configuration that includes a measurement duration time (e.g., a timer value for the T331 timer). In addition, the source network node stores the UE context of the UE and a timestamp (step 1002). As discussed above, the timestamp indicates the time at which the idle mode measurement configuration is sent to the UE (i.e., the time at which the UE transitions from connected state to the dormant state). As also discussed above, the timestamp may be stored in the UE context or in association with the UE context.

Upon receiving the message of step 1000, the UE transitions from the connected state to the dormant state (steps 1004). While in the dormant state (and as long as an associated first timer has not expired or been stopped), the UE performs one or more idle mode measurements in accordance with the idle mode measurement configuration (step 1006). In this example, it is desirable for the UE to resume its connection with the target network node. In association with the resuming of the connection, the source network node sends the UE context of the UE and the associated timestamp to the target network node (step 1008). Again, as discussed above, the timestamp may be included in the UE context or provided in association with the UE context. The UE subsequently receives a message (e.g., an RRC connection setup or RRC Connection Resume) from the target network node (i.e., a network node other than the source network node) that triggers the UE to transition from the dormant state to the connected state (step 1010). Optionally, the UE sends, in this example, a message that includes an indication that idle mode measurements are available to the target network node (step 1012). The UE sends the idle mode measurements to the target network node, e.g., in a respective report (step 1014). Optionally, the target network node utilizes the idle mode measurements if, as indicated by the associated measurement timestamps, the amount of time that has elapsed since the idle mode measurements were made is less than a predefined or preconfigured threshold amount of time (step 1016). If valid, the target network node may utilize the idle mode measurements, as described above. Otherwise, the target network node may discard the idle mode measurements.

3 Additional Details

Figure 11:
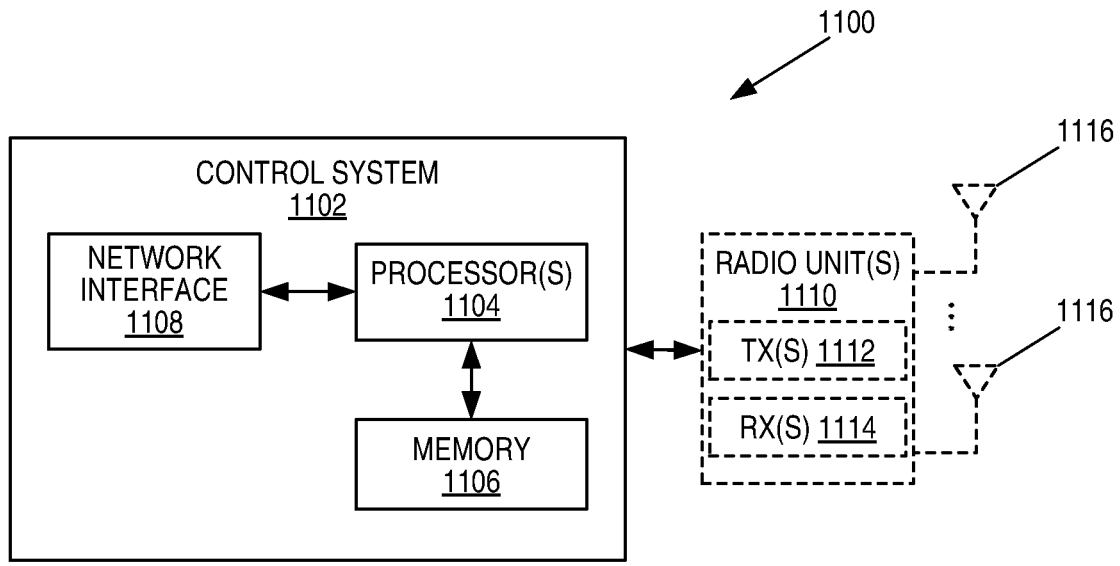
FIGS. 11 through 13 are schematic block diagrams of example embodiments of a radio access node.

FIG. 11 is a schematic block diagram of a radio access node 1100 according to some embodiments of the present disclosure. The radio access node 1100 may be, for example, a base station 502 or 506. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 includes one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein (e.g., one or more functions of a network node as described herein). In some embodiments, the function(s) are implemented in software that is stored, e.g., in the memory 1106 and executed by the one or more processors 1104.

Figure 12:
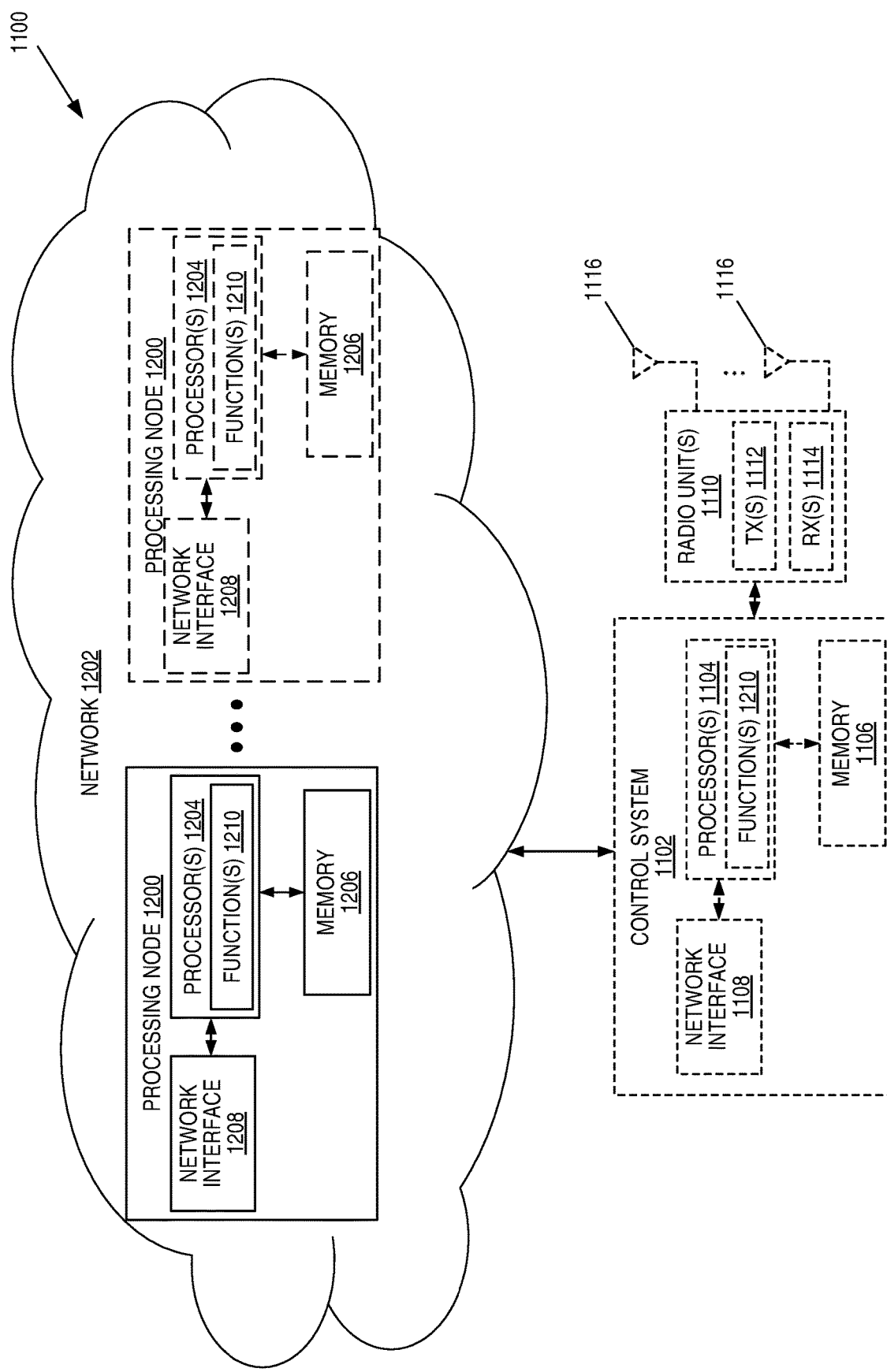

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node (s) in a network(s)). As illustrated, in this example, the radio access node 1100 includes the control system 1102 that includes the one or more processors 1104 (e.g., CPUs, ASICs, FPGAs, and/or the like), the memory 1106, and the network interface 1108 the one or more radio units 1110 that each includes the one or more transmitters 1112 and the one or more receivers 1114 coupled to the one or more antennas 1116, as described above. The control system 1102 is connected to the radio unit(s) 1110 via, for example, an optical cable or the like. The control system 1102 is connected to one or more processing nodes 1200 coupled to or included as part of a network(s) 1202 via the network interface 1108. Each processing node 1200 includes one or more processors 1204 (e.g., CPUs, ASICs, FPGAs, and/or the like), memory 1206, and a network interface 1208.

In this example, functions 1210 of the radio access node 1100 described herein (e.g., one or more functions of a network node as described herein) are implemented at the one or more processing nodes 1200 or distributed across the control system 1102 and the one or more processing nodes 1200 in any desired manner. In some particular embodiments, some or all of the functions 1210 of the radio access node 1100 described herein (e.g., one or more functions of a network node 1100 as described herein) are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 (e.g., one or more functions of a network node as described herein) or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
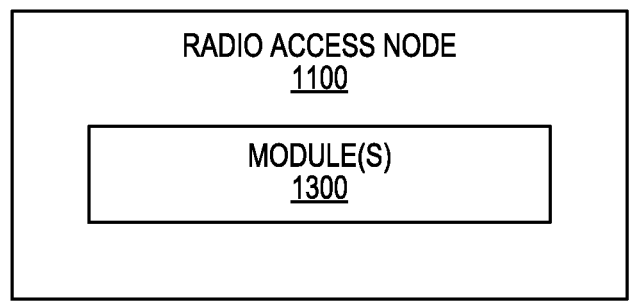

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein (e.g., one or more functions of a network node as described herein). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
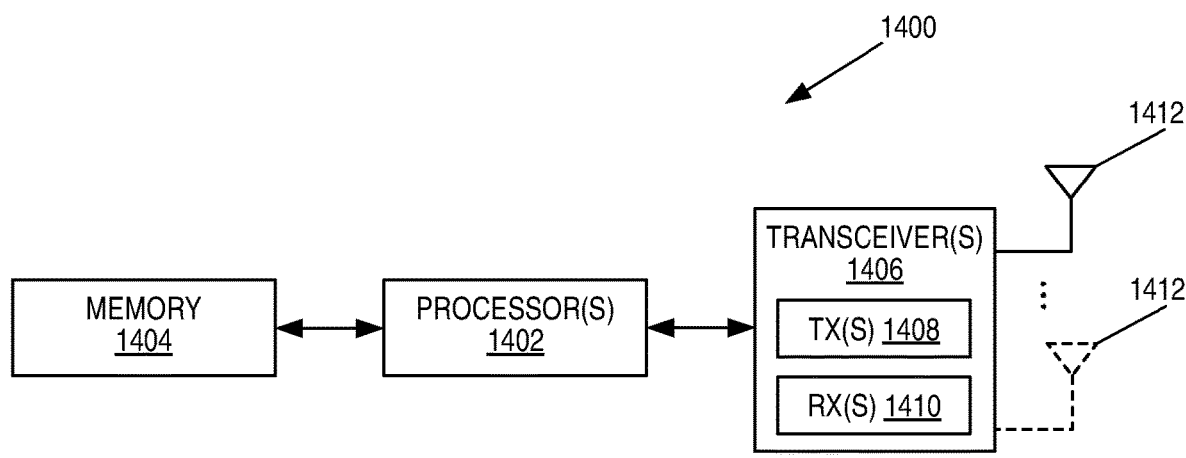
FIGS. 14 and 15 are schematic block diagrams of example embodiments of a UE.

FIG. 14 is a schematic block diagram of a UE 1400 according to some embodiments of the present disclosure. As illustrated, the UE 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the UE 1400 described above may be fully or partially implemented in software that is, e.g., stored in the memory 1404 and executed by the processor(s) 1402. Note that the UE 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the UE 1400 and/or allowing output of information from the UE 1400), a power supply (e.g., a battery and associated power circuitry), etc.

In some embodiments, a computer program including instructions which, when executed by at least one processor, causes the at least one processor to carry out the functionality of the UE 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
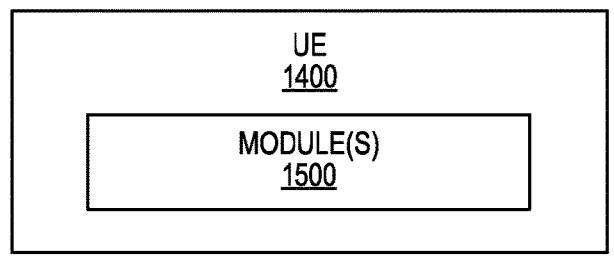

FIG. 15 is a schematic block diagram of the UE 1400 according to some other embodiments of the present disclosure. The UE 1400 includes one or more modules 1500, each of which is implemented in software. The module(s) 1500 provide the functionality of the UE 1400 described herein.

Figure 16:
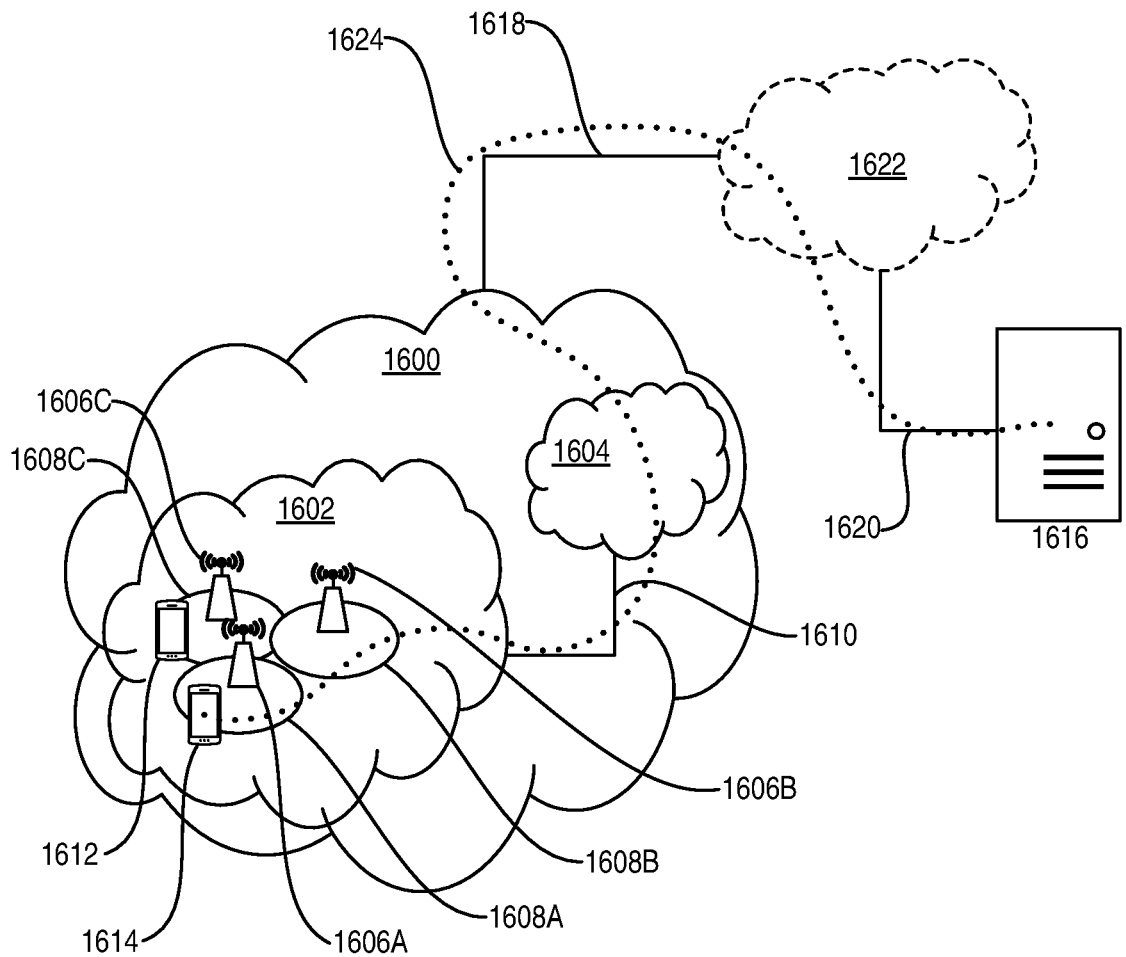
FIG. 16 illustrates an example of a communication system in which embodiments of the present disclosure may be implemented.

With reference to FIG. 16, in accordance with an embodiment, a communication system includes a telecommunication network 1600, such as a 3GPP-type cellular network, which comprises an access network 1602, such as a RAN, and a core network 1604. The access network 1602 comprises a plurality of base stations 1606A, 1606B, 1606C, such as Node Bs, eNBs, gNBs, or other types of wireless Access Points (APs), each defining a corresponding coverage area 1608A, 1608B, 1608C. Each base station 1606A, 1606B, 1606C is connectable to the core network 1604 over a wired or wireless connection 1610. A first UE 1612 located in coverage area 1608C is configured to wirelessly connect to, or be paged by, the corresponding base station 1606C. A second UE 1614 in coverage area 1608A is wirelessly connectable to the corresponding base station 1606A. While a plurality of UEs 1612, 1614 are illustrated in this example, the disclosed embodiments are equally applicable to a situation where a sole UE is in the coverage area or where a sole UE is connecting to the corresponding base station 1606.

The telecommunication network 1600 is itself connected to a host computer 1616, which may be embodied in the hardware and/or software of a standalone server, a cloud-implemented server, a distributed server, or as processing resources in a server farm. The host computer 1616 may be under the ownership or control of a service provider, or may be operated by the service provider or on behalf of the service provider. Connections 1618 and 1620 between the telecommunication network 1600 and the host computer 1616 may extend directly from the core network 1604 to the host computer 1616 or may go via an optional intermediate network 1622. The intermediate network 1622 may be one of, or a combination of more than one of, a public, private, or hosted network; the intermediate network 1622, if any, may be a backbone network or the Internet; in particular, the intermediate network 1622 may comprise two or more sub-networks (not shown).

The communication system of FIG. 16 as a whole enables connectivity between the connected UEs 1612, 1614 and the host computer 1616. The connectivity may be described as an Over-the-Top (OTT) connection 1624. The host computer 1616 and the connected UEs 1612, 1614 are configured to communicate data and/or signaling via the OTT connection 1624, using the access network 1602, the core network 1604, any intermediate network 1622, and possible further infrastructure (not shown) as intermediaries. The OTT connection 1624 may be transparent in the sense that the participating communication devices through which the OTT connection 1624 passes are unaware of routing of uplink and downlink communications. For example, the base station 1606 may not or need not be informed about the past routing of an incoming downlink communication with data originating from the host computer 1616 to be forwarded (e.g., handed over) to a connected UE 1612. Similarly, the base station 1606 need not be aware of the future routing of an outgoing uplink communication originating from the UE 1612 towards the host computer 1616.

Example implementations, in accordance with an embodiment, of the UE, base station, and host computer discussed in the preceding paragraphs will now be described with reference to FIG. 17. In a communication system 1700, a host computer 1702 comprises hardware 1704 including a communication interface 1706 configured to set up and maintain a wired or wireless connection with an interface of a different communication device of the communication system 1700. The host computer 1702 further comprises processing circuitry 1708, which may have storage and/or processing capabilities. In particular, the processing circuitry 1708 may comprise one or more programmable processors, ASICs, FPGAs, or combinations of these (not shown) adapted to execute instructions. The host computer 1702 further comprises software 1710, which is stored in or accessible by the host computer 1702 and executable by the processing circuitry 1708. The software 1710 includes a host application 1712. The host application 1712 may be operable to provide a service to a remote user, such as a UE 1714 connecting via an OTT connection 1716 terminating at the UE 1714 and the host computer 1702. In providing the service to the remote user, the host application 1712 may provide user data which is transmitted using the OTT connection 1716.

The communication system 1700 further includes a base station 1718 provided in a telecommunication system and comprising hardware 1720 enabling it to communicate with the host computer 1702 and with the UE 1714. The hardware 1720 may include a communication interface 1722 for setting up and maintaining a wired or wireless connection with an interface of a different communication device of the communication system 1700, as well as a radio interface 1724 for setting up and maintaining at least a wireless connection 1726 with the UE 1714 located in a coverage area (not shown in FIG. 17) served by the base station 1718. The communication interface 1722 may be configured to facilitate a connection 1728 to the host computer 1702. The connection 1728 may be direct or it may pass through a core network (not shown in FIG. 17) of the telecommunication system and/or through one or more intermediate networks outside the telecommunication system. In the embodiment shown, the hardware 1720 of the base station 1718 further includes processing circuitry 1730, which may comprise one or more programmable processors, ASICs, FPGAs, or combinations of these (not shown) adapted to execute instructions. The base station 1718 further has software 1732 stored internally or accessible via an external connection.

The communication system 1700 further includes the UE 1714 already referred to. The UE's 1714 hardware 1734 may include a radio interface 1736 configured to set up and maintain a wireless connection 1726 with a base station serving a coverage area in which the UE 1714 is currently located. The hardware 1734 of the UE 1714 further includes processing circuitry 1738, which may comprise one or more programmable processors, ASICs, FPGAs, or combinations of these (not shown) adapted to execute instructions. The UE 1714 further comprises software 1740, which is stored in or accessible by the UE 1714 and executable by the processing circuitry 1738. The software 1740 includes a client application 1742. The client application 1742 may be operable to provide a service to a human or non-human user via the UE 1714, with the support of the host computer 1702. In the host computer 1702, the executing host application 1712 may communicate with the executing client application 1742 via the OTT connection 1716 terminating at the UE 1714 and the host computer 1702. In providing the service to the user, the client application 1742 may receive request data from the host application 1712 and provide user data in response to the request data. The OTT connection 1716 may transfer both the request data and the user data. The client application 1742 may interact with the user to generate the user data that it provides.

Figure 17:
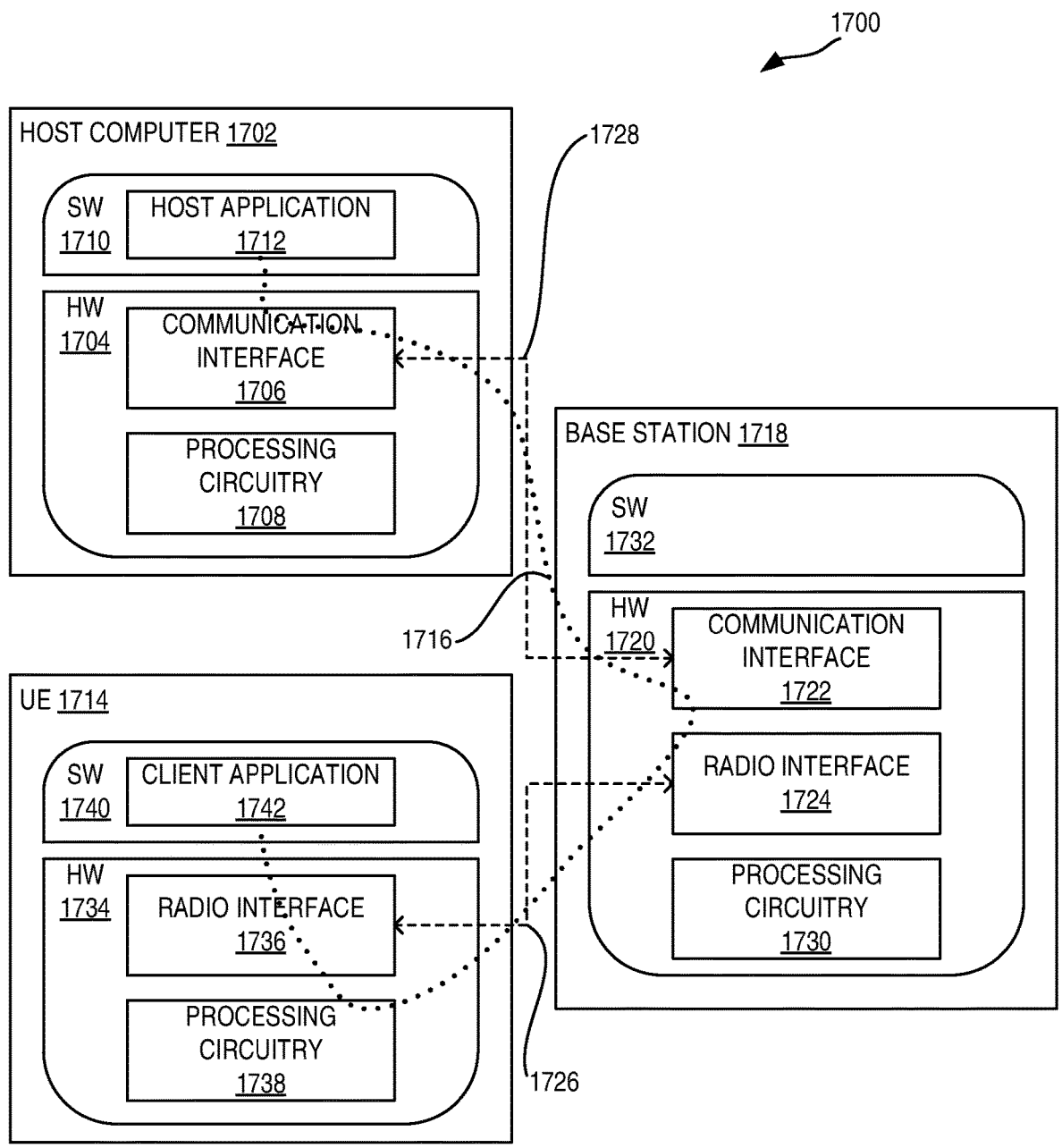
FIG. 17 illustrates example embodiments of the host computer, base station, and UE of the system of FIG. 16.

It is noted that the host computer 1702, the base station 1718, and the UE 1714 illustrated in FIG. 17 may be similar or identical to the host computer 1616, one of the base stations 1606A, 1606B, 1606C, and one of the UEs 1612, 1614 of FIG. 16, respectively. This is to say, the inner workings of these entities may be as shown in FIG. 17 and independently, the surrounding network topology may be that of FIG. 16.

In FIG. 17, the OTT connection 1716 has been drawn abstractly to illustrate the communication between the host computer 1702 and the UE 1714 via the base station 1718 without explicit reference to any intermediary devices and the precise routing of messages via these devices. The network infrastructure may determine the routing, which may be configured to hide from the UE 1714 or from the service provider operating the host computer 1702, or both. While the OTT connection 1716 is active, the network infrastructure may further take decisions by which it dynamically changes the routing (e.g., on the basis of load balancing consideration or reconfiguration of the network).

The wireless connection 1726 between the UE 1714 and the base station 1718 is in accordance with the teachings of the embodiments described throughout this disclosure. One or more of the various embodiments improve the performance of OTT services provided to the UE 1714 using the OTT connection 1716, in which the wireless connection 1726 forms the last segment.

A measurement procedure may be provided for the purpose of monitoring data rate, latency, and other factors on which the one or more embodiments improve. There may further be an optional network functionality for reconfiguring the OTT connection 1716 between the host computer 1702 and the UE 1714, in response to variations in the measurement results. The measurement procedure and/or the network functionality for reconfiguring the OTT connection 1716 may be implemented in the software 1710 and the hardware 1704 of the host computer 1702 or in the software 1740 and the hardware 1734 of the UE 1714, or both. In some embodiments, sensors (not shown) may be deployed in or in association with communication devices through which the OTT connection 1716 passes; the sensors may participate in the measurement procedure by supplying values of the monitored quantities exemplified above, or supplying values of other physical quantities from which the software 1710, 1740 may compute or estimate the monitored quantities. The reconfiguring of the OTT connection 1716 may include message format, retransmission settings, preferred routing, etc.; the reconfiguring need not affect the base station 1718, and it may be unknown or imperceptible to the base station 1718. Such procedures and functionalities may be known and practiced in the art. In certain embodiments, measurements may involve proprietary UE signaling facilitating the host computer 1702's measurements of throughput, propagation times, latency, and the like. The measurements may be implemented in that the software 1710 and 1740 causes messages to be transmitted, in particular empty or 'dummy' messages, using the OTT connection 1716 while it monitors propagation times, errors, etc.

FIG. 18 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 18 will be included in this section. In step 1800, the host computer provides user data. In sub-step 1802 (which may be optional) of step 1800, the host computer provides the user data by executing a host application. In step 1804, the host computer initiates a transmission carrying the user data to the UE. In step 1806 (which may be optional), the base station transmits to the UE the user data which was carried in the transmission that the host computer initiated, in accordance with the teachings of the embodiments described throughout this disclosure. In step 1808 (which may also be optional), the UE executes a client application associated with the host application executed by the host computer.

FIG. 19 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 19 will be included in this section. In step 1900 of the method, the host computer provides user data. In an optional sub-step (not shown) the host computer provides the user data by executing a host application. In step 1902, the host computer initiates a transmission carrying the user data to the UE. The transmission may pass via the base station, in accordance with the teachings of the embodiments described throughout this disclosure. In step 1904 (which may be optional), the UE receives the user data carried in the transmission.

FIG. 20 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 20 will be included in this section. In step 2000 (which may be optional), the UE receives input data provided by the host computer. Additionally or alternatively, in step 2002, the UE provides user data. In sub-step 2004 (which may be optional) of step 2000, the UE provides the user data by executing a client application. In sub-step 2006 (which may be optional) of step 2002, the UE executes a client application which provides the user data in reaction to the received input data provided by the host computer. In providing the user data, the executed client application may further consider user input received from the user. Regardless of the specific manner in which the user data was provided, the UE initiates, in sub-step 2008 (which may be optional), transmission of the user data to the host computer. In step 2010 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 21 will be included in this section. In step 2100 (which may be optional), in accordance with the teachings of the embodiments described throughout this disclosure, the base station receives user data from the UE. In step 2102 (which may be optional), the base station initiates transmission of the received user data to the host computer. In step 2104 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method performed by a wireless device, the method comprising: receiving (600, 700, 800), from a network node, an idle mode measurement configuration comprising a measurement duration time value and a validity time value for idle mode measurements; while in a dormant state, performing (604, 704, 804) one or more idle mode measurements according to the idle mode measurement configuration; determining (608, 706, 808) that one or more idle mode measurement reports are invalid based on the validity time value; and deleting (610, 708, 812) the one or more idle mode measurement reports after determining that the one or more idle mode measurement reports are invalid based on the validity time value.

Embodiment 2: The method of embodiment 1 further comprising: starting (602) a first timer upon transitioning from a connected state to the dormant state, the first timer being initialized to the measurement duration time value; and starting (606) a second timer upon expiry of the first timer, the second timer being initialized to the validity time value; wherein determining (608, 706, 808) that the one or more idle mode measurement reports are invalid based on the validity time value comprises determining (608) that the second timer has expired.

Embodiment 3: The method of embodiment 1 further comprising: starting (602) a first timer (e.g., T331) upon transitioning from a connected state to the dormant state, the first timer being initialized to the measurement duration time value; and starting (606) a second timer upon expiry of the first timer, the second timer being initialized to the validity time value; wherein determining (608, 706, 808) that the one or more idle mode measurement reports are invalid based on the validity time value comprises determining (608) that the second timer has expired prior to a time at which the one or more idle mode measurement reports could be reported by the wireless device (e.g., prior to receiving a message from a network node that initiates a transition of the wireless device from the dormant state to a connected state).

Embodiment 4: The method of embodiment 1 further comprising: starting (702) a validity timer upon transitioning from a connected state to the dormant state, the validity timer being initialized to the validity time value; wherein determining (608, 706, 808) that the one or more idle mode measurement reports are invalid based on the validity time value comprises determining (706) that the validity timer has expired.

Embodiment 5: The method of embodiment 1 further comprising: starting (702) a validity timer upon transitioning from a connected state to the dormant state, the validity timer being initialized to the validity time value; wherein determining (608, 706, 808) that the one or more idle mode measurement reports are invalid based on the validity time value comprises determining (706) that the validity timer has expired prior to a time at which the one or more idle mode measurement reports could be reported by the wireless device (e.g., prior to receiving a message from a network node that initiates a transition of the wireless device from the dormant state to a connected state).

Embodiment 6: The method of embodiment 1 further comprising: receiving (806) a message from a network node that initiates a transition of the wireless device from the dormant state to a connected state; wherein determining (608, 706, 808) that the one or more idle mode measurement reports are invalid based on the validity time value comprises determining (808) whether an elapsed amount of time is greater than the validity time value.

Embodiment 7: The method of embodiment 6 wherein the elapsed amount of time is an amount of time since the wireless device transitioned to the dormant state.

Embodiment 8: The method of embodiment 6 further comprising: starting (602) a first timer upon transitioning from a connected state to the dormant state; wherein: performing (604, 704, 804) the one or more idle mode measurements comprises performing (804) the one or more idle mode measurements until the first timer has expired; and the elapsed amount of time is an amount of time since the first timer expired.

Embodiment 9: The method of any one of embodiments 1 to 8 further comprising refraining from sending an indication to the network node that idle mode measurements are available at the wireless device.

Embodiment 10: The method of any one of embodiments 1 to 9 wherein the measurement duration time value and the validity time value are the same (i.e., a single configured value is both the measurement duration time value and the validity time value).

Embodiment 11: The method of any one of embodiments 1 to 9 wherein the measurement duration time value and the validity time value are different configured values.

Embodiment 12: A method performed by a wireless device, the method comprising:
while in a dormant state:
  performing (904) one or more idle mode measurements; and
  storing (904) the one or more idle mode measurements with associated measurement timestamps;
receiving (906) a message from a network node that initiates a transition of the wireless device from the dormant state to a connected state; and
sending (910) the one or more idle mode measurements and the associated measurement timestamps to the network node.

Embodiment 13: The method of embodiment 12 further comprising, upon receiving (906) the message from the network node that initiates the transition of the wireless device from the dormant state to the connected state, sending (908) a message to the network node that comprises an indication that the wireless device has available idle mode measurements.

Embodiment 14: A method performed by a network node (e.g., a base station), comprising: sending (600, 700, 800), to a wireless device, a validity time value for idle mode measurements.

Embodiment 15: The method of embodiment 14 wherein sending (600, 700, 800) the validity time value for idle mode measurements comprises sending (600, 700, 800), to the wireless device, an idle mode measurement configuration comprising the validity time value.

Embodiment 16: A method performed by a network node (e.g., a base station), comprising: sending (900), to a wireless device, an idle mode measurement configuration; and receiving (910), from the wireless device, one or more idle mode measurements and associated measurement timestamps.

Embodiment 17: The method of embodiment 16 further comprising utilizing (912) (e.g., for MC, DC, or CA configuration for a UE) the one or more idle mode measurements if an amount of time since the one or more idle mode measurements were made by the wireless device, as indicated by the associated measurement timestamps, is less than a predefined or preconfigured threshold amount of time.

Embodiment 18: The method of embodiment 16 further comprising discarding the one or more idle mode measurements if an amount of time since the one or more idle mode measurements were made by the wireless device, as indicated by the associated measurement timestamps, is greater than a predefined or preconfigured threshold amount of time.

Embodiment 19: The method of any one of embodiments 14 to 18 further comprising storing timing information that indicates a time at which the wireless device transitioned from a connected state to a dormant state (e.g., in which the one or more idle mode measurements are made).

Embodiment 20: The method of embodiment 19 further comprising sending the timing information to another network node.

Embodiment 21: The method of embodiment 19 or 20 wherein the timing information is stored (e.g., in a UE AS context of the wireless device).

Embodiment 22: A wireless device, the wireless device comprising: one or more transmitters; one or more receivers; and processing circuitry associated with the one or more transmitters and the one or more receivers, the processing circuitry configured to cause the wireless device to perform the method of any one of embodiments 1 to 13.

Embodiment 23: A network node (e.g., a base station) comprising: a communication interface; and processing circuitry associated with the communication interface, the processing circuitry configured to cause the network node to perform the method of any one of embodiments 14 to 21.

Embodiment 24: The network node of embodiment 23 wherein the communication interface comprises a network interface.

Embodiment 25: The network node of embodiment 23 or 24 wherein the communication interface comprises one or more radio units.

At least some of the following abbreviations may be used in this disclosure. If there is an inconsistency between abbreviations, preference should be given to how it is used above. If listed multiple times below, the first listing should be preferred over any subsequent listing(s).
3GPP Third Generation Partnership Project
5G Fifth Generation
5GC Fifth Generation Core
AP Access Point
AS Access Stratum
ASIC Application Specific Integrated Circuit
CA Carrier Aggregation
CPU Central Processing Unit
DC Dual Connectivity
DSP Digital Signal Processor
eNB Enhanced or Evolved Node B
EN-DC Evolved Universal Terrestrial Radio Access New Radio Dual Connectivity
EPC Evolved Packet Core
E-UTRA Evolved Universal Terrestrial Radio Access
FPGA Field Programmable Gate Array
FR Frequency Range
GHz Gigahertz
gNB New Radio Base Station
IE Information Element
LTE Long Term Evolution
MC Multi-Connectivity
MCG Master Cell Group
MeNB Master Enhanced or Evolved Node B
MHz Megahertz
MME Mobility Management Entity
MN Master Node
MTC Machine Type Communication
NR New Radio
OTT Over-the-Top
P-GW Packet Data Network Gateway
RAM Random Access Memory
RAN Radio Access Network
ROM Read Only Memory
RRC Radio Resource Control
RRH Remote Radio Head
RSRP Reference Signal Received Power
RSRQ Reference Signal Received Quality
RTT Round Trip Time
SCEF Service Capability Exposure Function
SCG Secondary Cell Group
SeNB Secondary Enhanced or Evolved Node B
SIB System Information Block
SN Secondary Node
SRB Signaling Radio Bearer
TS Technical Specification
UE User Equipment Those skilled in the art will recognize improvements and modifications to the embodiments of the present disclosure. All such improvements and modifications are considered within the scope of the concepts disclosed herein.

What is claimed is:

1. A method performed by a wireless device for determining a validity of one or more idle mode measurements performed for a cellular communications network, the method comprising:
receiving, from a network node, an idle mode measurement configuration comprising a measurement duration time value and a validity time value for idle mode measurements;
while in a dormant state, performing one or more idle mode measurements according to the idle mode measurement configuration;
determining that one or more idle mode measurement reports are invalid based on the validity time value, wherein the validity time value indicates a length of time for which the idle mode measurements are stored after performance of an idle mode measurement operation; and
deleting the one or more idle mode measurement reports after determining that the one or more idle mode measurement reports are invalid based on the validity time value.

2. The method of claim 1 further comprising:
starting a first timer upon transitioning from a connected state to the dormant state, the first timer being initialized to the measurement duration time value; and
starting a second timer upon expiry of the first timer, the second timer being initialized to the validity time value;
wherein determining that the one or more idle mode measurement reports are invalid based on the validity time value comprises determining that the second timer has expired.

3. The method of claim 1 further comprising:
starting a first timer upon transitioning from a connected state to the dormant state, the first timer being initialized to the measurement duration time value; and
starting a second timer upon expiry of the first timer, the second timer being initialized to the validity time value;
wherein determining that the one or more idle mode measurement reports are invalid based on the validity time value comprises determining that the second timer has expired prior to a time at which the one or more idle mode measurement reports could be reported by the wireless device.

4. The method of claim 1 further comprising:
starting a first timer upon transitioning from a connected state to the dormant state, the first timer being initialized to the measurement duration time value; and
starting a second timer upon expiry of the first timer, the second timer being initialized to the validity time value;
wherein determining that the one or more idle mode measurement reports are invalid based on the validity time value comprises determining that the second timer has expired prior to receiving a message from a network node that initiates a transition of the wireless device from the dormant state to the connected sate.

5. The method of claim 1 further comprising:
starting a validity timer upon transitioning from a connected state to the dormant state, the validity timer being initialized to the validity time value;
wherein determining that the one or more idle mode measurement reports are invalid based on the validity time value comprises determining that the validity timer has expired.

6. The method of claim 5 further comprising:
starting a measurement duration timer upon transitioning from the connected state to the dormant state, the measurement duration timer being initialized to the measurement duration time value;
wherein performing the one or more idle mode measurements according to the idle mode measurement configuration comprises performing the one or more idle mode measurements according to the idle mode measurement configuration until the measurement duration timer has expired or is otherwise stopped.

7. The method of claim 1 further comprising:
starting a validity timer upon transitioning from a connected state to the dormant state, the validity timer being initialized to the validity time value;
wherein determining that the one or more idle mode measurement reports are invalid based on the validity time value comprises determining that the validity timer has expired prior to a time at which the one or more idle mode measurement reports could be reported by the wireless device.

8. The method of claim 1 further comprising:
starting a validity timer upon transitioning from a connected state to the dormant state, the validity timer being initialized to the validity time value;
wherein determining that the one or more idle mode measurement reports are invalid based on the validity time value comprises determining that the validity timer has expired prior to receiving a message from a network node that initiates a transition of the wireless device from the dormant state to the connected state.

9. The method of claim 1 further comprising:
receiving a message from a network node that initiates a transition of the wireless device from the dormant state to a connected state;
wherein determining that the one or more idle mode measurement reports are invalid based on the validity time value comprises determining whether an elapsed amount of time is greater than the validity time value.

10. The method of claim 9 wherein the elapsed amount of time is an amount of time since the wireless device transitioned to the dormant state.

11. A wireless device for determining a validity of one or more idle mode measurements performed for a cellular communications network, the wireless device adapted to:
receive, from a network node, an idle mode measurement configuration comprising a measurement duration time value and a validity time value for idle mode measurements;
while in a dormant state, perform one or more idle mode measurements according to the idle mode measurement configuration;
determine that one or more idle mode measurement reports are invalid based on the validity time value, wherein the validity time value indicates a length of time for which the idle mode measurements are stored after performance of an idle mode measurement operation; and
delete the one or more idle mode measurement reports after determining that the one or more idle mode measurement reports are invalid based on the validity time value.

12. The wireless device of claim 11 wherein the wireless device comprises:
one or more transmitters;
one or more receivers; and
processing circuitry associated with the one or more transmitters and the one or more receivers, the processing circuitry configured to cause the wireless device to:
receive the idle mode measurement configuration from the network node;
while in the dormant state, perform the one or more idle mode measurements according to the idle mode measurement configuration;
determine that the one or more idle mode measurement reports are invalid based on the validity time value; and
delete the one or more idle mode measurement reports after determining that the one or more idle mode measurement reports are invalid based on the validity time value.

13. A method performed by a network node to enable determination of a validity of one or more idle mode measurements performed for a cellular communications network, comprising:
sending, to a wireless device, a validity time value for idle mode measurements, wherein the validity time value indicates a length of time for which the idle mode measurements are stored after performance of an idle mode measurement operation.

14. The method of claim 13 wherein sending the validity time value for idle mode measurements comprises sending, to the wireless device, an idle mode measurement configuration comprising the validity time value.

15. The method of claim 14 wherein the idle mode measurement configuration comprises the validity time value and a measurement duration value.

16. The method of claim 15 wherein the measurement duration value indicates a first amount of time during which the wireless device is to perform idle mode measurements starting from a time of receipt of the idle mode measurement configuration.

17. The method of claim 16 wherein the validity time value indicates a second amount of time for which idle mode measurements performed by the wireless device are valid, the second amount of time being relative to an end of a period of time during which the wireless device performs idle mode measurements, wherein the period of time during which the wireless device performs idle mode measurements has a duration equal to the first amount of time indicated by the measurement duration value.

18. The method of claim 13 wherein the validity time value indicates an amount of time for which idle mode measurements performed by the wireless device are valid, the amount of time being relative to a time at which the wireless device starts performing the idle mode measurements.

19. A network node to enable determination of a validity of one or more idle mode measurements performed for a cellular communications network, the network node adapted to:
   send, to a wireless device, a validity time value for idle mode measurements, wherein the validity time value indicates a length of time for which the idle mode measurements are stored after performance of an idle mode measurement operation.

20. The network node of claim 19 wherein the network node comprises:
   a communication interface; and
   processing circuitry associated with the communication interface, the processing circuitry configured to cause the network node to send the validity time value for idle mode measurements to the wireless device.

* * * * *